United States Patent
Mikuni

(10) Patent No.: US 6,314,203 B1
(45) Date of Patent: Nov. 6, 2001

(54) IMAGE PROCESSING APPARATUS CAPABLE OF SYNTHESIZING IMAGES BASED ON TRANSMITTANCE DATA

(75) Inventor: Shin Mikuni, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/541,586

(22) Filed: Apr. 3, 2000

Related U.S. Application Data

(62) Division of application No. 08/969,169, filed on Nov. 12, 1997, now Pat. No. 6,072,914.

(30) Foreign Application Priority Data

Nov. 14, 1996 (JP) .................................................. 8-302588

(51) Int. Cl.⁷ ........................................................ G06K 9/00
(52) U.S. Cl. ............................................ 382/167; 358/523
(58) Field of Search .................................. 382/162, 167; 358/518, 523, 1.9; 345/153, 150, 155

(56) References Cited

U.S. PATENT DOCUMENTS

| | | | |
|---|---|---|---|
| 5,202,935 | * 4/1993 | Kanamori et al. | 382/54 |
| 5,430,465 | * 7/1995 | Sabella et al. | 345/199 |
| 5,581,377 | 12/1996 | Shimizu et al. | 382/284 |
| 5,761,339 | 6/1998 | Ikeshoji et al. | 382/284 |
| 5,781,666 | 7/1998 | Ishizawa et al. | 382/284 |
| 5,790,091 | * 8/1998 | Hashimoto | 345/150 |
| 5,903,278 | * 5/1999 | Mitchell et al. | 345/431 |

* cited by examiner

*Primary Examiner*—Yon J. Couso
(74) *Attorney, Agent, or Firm*—Frishauf, Holtz, Goodman, Langer & Chick, P.C.

(57) ABSTRACT

In an image processing apparatus, a plurality of images can be simply synthesized with each other without preparing a specific image such as an image extracting image. In this image processing apparatus, a distribution rate of the respective color data of each of pixels in first image data and second image data is calculated in the case that the first image data is synthesized with the second image data based on transmittance data of the first and second image data, and a value of color data of each pixel in a synthesized image is calculated, and then the first image data is synthesized with the second image data based upon this color data value.

5 Claims, 25 Drawing Sheets

190

| | SUNRISE | STANDARD | SUNSET | NIGHT |
|---|---|---|---|---|
| DECORATION FLAG GROUP (1) | DARK GREEN | LIGHT GREEN | DARK GREEN | BLACKISH GREEN |
| DECORATION FLAG GROUP (2) | LIGHT BLUE | LIGHT BLUE | DARK RED | COBALT BLUE |
| DECORATION FLAG GROUP (3) | BLACKISH GREEN | BLACKISH GREEN | BLACKISH GREEN | DARK BLACKISH-GREEN |
| DECORATION FLAG GROUP (4) | DARK GREEN | GREEN | DARK GREEN | DARK GREEN |
| DECORATION FLAG GROUP (5) | LIGHT GREY | LIGHT YELLOW | LIGHT GREY | DARK GREY |
| DECORATION FLAG GROUP (6) | BLUE | DARK BLUE | BLUE | BLACK |
| DECORATION FLAG GROUP (7) | DARK BROWN | BROWN | DARK BROWN | BLACK BROWN |

|  | RED R | GREEN G | BLUE B | RED-GREEN Δr | GREEN-BLUE Δg | BLUE-RED Δb |
|---|---|---|---|---|---|---|
| RED | 100 | 0 | 0 | 100 | 0 | -100 |
| LIGHT RED | 100 | 50 | 50 | 50 | 0 | -50 |
| DARK RED | 60 | 0 | 0 | 60 | 0 | -60 |
| PURPLE | 100 | 0 | 100 | 100 | -100 | 0 |
| BLUE | 0 | 0 | 100 | 0 | -100 | 100 |

FIG.2

|  | BLUE | PURPLE | DARK RED | LIGHT RED | RED |
|---|---|---|---|---|---|
| RED | 245 | 141 | 57 | 70 | 0 |
| LIGHT RED | 187 | 122 | 14 | 0 | |
| DARK RED | 198 | 123 | 0 | | |
| PURPLE | 141 | 0 | | | |
| BLUE | 0 | | | | |

FIG.3

| DECORATION FLAG GROUP FL 1 | EFFECTS OF FLAG |
|---|---|
| BIT 0 | COPY Gd TO PRODUCE Rd |
| BIT 1 | HALF VALUE OF Gd |
| BIT 2 | SET ALL COLORS TO 0 |
| BIT 3 | REPLACE Gd VALUE BY Rd VALUE |
| BIT 4 | REPLACE Rd VALUE BY Bd VALUE |
| BIT 5 | REPLACE Bd VALUE BY Gd VALUE |

FIG.18

IMAGE PROCESSING APPARATUS CAPABLE OF SYNTHESIZING IMAGES BASED ON TRANSMITTANCE DATA

This application is a Divisional of Ser. No. 08/969,169 filed Nov. 12, 1997 Pat. No. 6,072,914.

BACKGROUND OF THE INVENTION

1. Field of the Invention

The present invention generally relates to an image processing apparatus for processing image data. More specifically, the present invention is directed to an image processing apparatus capable of synthesizing a plurality of image data based upon transmittance data, depth value data, or attribute data, set to these image data.

2. Description of the Related Art

Conventionally, the synthesizing techniques for synthesizing two sets of images have been proposed in the field. For instance, a so-called "blue back cutting method" used in the television field is known in the art. This "blue back cutting method" will now be summarized with reference to FIG. 23 to FIG. 27.

An image "1" shown in FIG. 23 is an image to be synthesized. As represented in FIG. 24, a hatched image portion "2" is derived from this image 1 by using a certain image processing technique known in the field. This hatched image portion 2 is defined by eliminating a rectangular image from the image 1. Then, this image portion 2 is uniformly rewritten by blue color, so that such an image 3 as indicated in FIG. 25 is formed from the image 1 shown in FIG. 23. In other words, in the image 3 shown in FIG. 25, an image portion other than the rectangular image is uniformly painted in blue color.

In the case that the image 3 indicated in FIG. 25 is synthesized with, for example, another image "4" which will constitute a background containing another rectangular figure as represented in FIG. 26, the following synthesizing process is carried out. That is, as to the blue-colored dot (pixel) portion of the image 3, the image 4 for constituting the above-explained background is used, whereas as to other portions of this image 3, the image 3 is utilized. As a consequence, as illustrated in FIG. 27, the rectangular image can be inserted into the image 4 shown FIG. 26, which constitutes the background.

However, in the above-described conventional image synthesizing method, such a specific image containing a blue-colored background image must be prepared. In this case, this blue-colored image could not be used except for the image synthesizing process, and therefore the use of this blue-colored image is limited only to the specific purpose. Also, when the plural images are synthesized with each other, since these plural images are merely inserted into the image portions other than the blue-colored image, there is a certain limitation in representations of the resulting synthesized image. That is, there is a narrow width representing the synthesized image. For instance, when images to be synthesized with each other are entirely opaque there is no representation limitation. To the contrary, when an image containing such a transparent portion as a window, e.g., an image of an automobile, a background image can be originally observed through the window of this automobile. However, the conventional image synthesizing method can not represent such an image.

Moreover, when a plurality of images are synthesized with each other, these images can not be overlapped with each other. Such images may represent expanding atmospheres along the depth direction to observers in the conventional image synthesizing method. As a consequence, when such an image is formed using the conventional image synthesizing method, a single image is subdivided into plural images, and the specific image exclusively used in the image synthesization must be formed, resulting in cumbersome processing operations.

SUMMARY OF THE INVENTION

The present invention has been made to solve the above-described problems, and therefore, has an object to provide an image processing apparatus capable of synthesizing a plurality of image data with each other based on transmittance data set to the image data to thereby form a synthesized image with sufficient image expressions.

Another object of the present invention is to provide an image processing apparatus capable of determining an overlapping order of a plurality of image data based on depth numeral data set to the image data, and capable of synthesizing the respective image data with each other based upon this overlapping order to thereby form a synthesized image with depth feelings.

A further object of the present invention is to provide an image processing apparatus capable of changing a color of image data based on attribute data set to the image data to thereby simply change the color of the image.

To achieve the above-explained objects, an image processing apparatus for synthesizing a plurality of image data with each other, according to an aspect of the present invention, is featured by comprising:

storage means for storing therein at least first and second image data to which transmittance data have been set;

calculating means for calculating a distribution rate of the respective color data of each of pixels in the first image data and second image data in the case that the first image data is synthesized with the second image data based on the transmittance data of said first image data, and for calculating a value of color data of each pixel in a synthesized image produced by synthesizing the first image data with the second image data based on the distribution rate; and synthesizing means for synthesizing the first image data with the second image data based on the values of the color data of the respective pixels calculated by the calculating means.

As a consequence, in accordance with the present invention, a plurality of image data are synthesized with each other based on the transmittance data set to the image data, so that such a synthesized image with sufficient expressions can be formed. When a plurality of images are synthesized with each other, no specific image for extracting the image is required, and thus the image synthesizing process operation can be simply performed.

BRIEF DESCRIPTION OF THE DRAWINGS

For a more complete understanding of the present invention, reference is made of a detailed description to be read in conjunction with the accompanying drawings, in which:

FIG. 2 represents an example of color difference data corresponding to the respective colors;

FIG. 3 shows an example of a hue difference degree in a certain color and another color;

FIGS. 15A–15E show examples of the image synthesizing process operation;

FIG. 18 illustrates an example of a content of a decoration flag group;

DETAILED DESCRIPTION OF THE PREFERRED EMBODIMENTS

Referring now to drawings, various preferred embodiments of the present invention will be described in detail.

IMAGE DATA FORMING APPARATUS OF FIRST EMBODIMENT MODE

Figure 1:
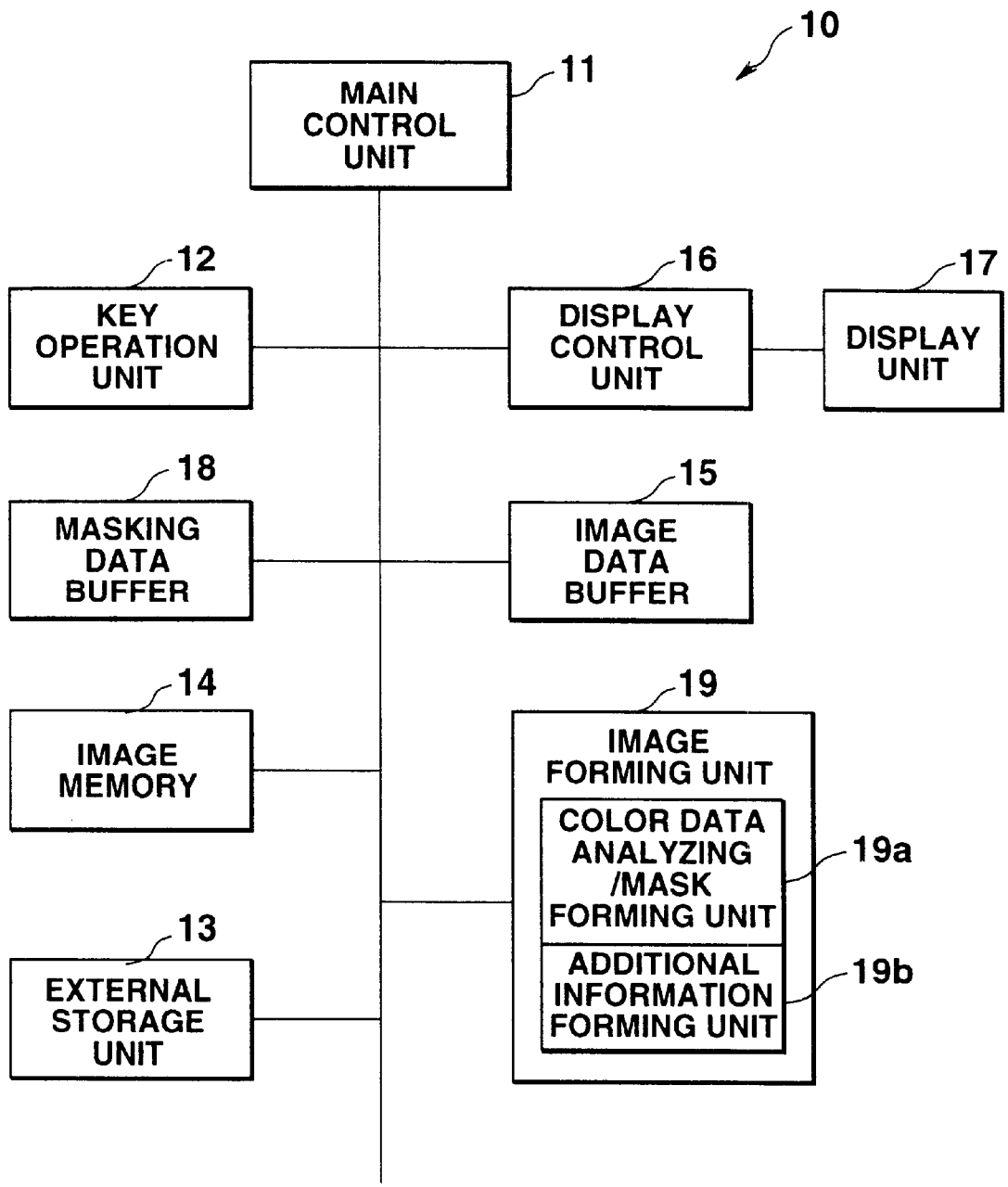
FIG. 1 is a schematic block diagram for representing a system arrangement of an image data forming apparatus according to a first embodiment mode of the present invention.

FIG. 1 is a schematic block diagram for showing a system arrangement of an image data forming apparatus 10 according to a first preferred embodiment of the present invention. This image data forming apparatus 10 corresponds to an apparatus used to form synthesized image data set to lower-grade 2 bits of R(red), G(green), and B(blue) data of each pixel, while employing any one of transmittance data, depth data, and a decoration flag group as additional information (will be discussed later).

A main control unit 11 is a circuit block for controlling an entire system in response to a key input signal issued from a key operation unit 12, and then is arranged by, for instance, a microprocessor.

The key operation unit 12 is such an input apparatus for inputting an instruction command used to produce the above-explained synthesized image data, and the like, and is equipped with a pointing device such as a plurality of keys and a mouse.

An external storage unit 13 is constructed of, for instance, a magnetic disk apparatus, an optical disk apparatus, and the like. This external storage unit 13 stores therein a plurality of image data.

An image memory 14 stores therein an image formed in this image forming system, or an image read from the external storage unit 13.

An image data buffer 15 temporarily stores therein such an image which is selected by manipulating the key operation unit 12 and is transferred from the image memory 14 under control of the main control unit 11.

A display control unit 16 causes a content of an image stored in this image data buffer 15 to be displayed on a screen of a display unit 17.

This display unit 17 corresponds to such a display constructed of, e.g., a CRT display and a liquid crystal display (LCD), for displaying an image stored in the image data display buffer 13.

A masking data buffer 18 is such a buffer for storing therein masking data of an image stored in the image memory 14. This masking data corresponds to such data used when the additional information such as the transmittance data, the depth data, and the decoration flag group is set to the lower-grade 2 bits of the R, G, B data about each of the pixels of the image stored in the image memory 14.

This masking data may be formed, for example, though the screen of the display unit 17. In other words, while a user displays a desirable image on the screen of the display unit 17, when the user designates an arbitrary pixel within a region to which, for example, transmittance is wanted to be set by using a pointing device such as a mouse, a pixel having a similar color shade to that of this designated pixel is extracted from the region containing the above-described designated pixel, and then an ON-flag is set to a bit corresponding to this extract pixel (namely, set ON-bit). As a result, masking data is produced in such a manner that the portion to which the ON-bit has been set is used as the region to which the transmittance is desirably set.

The content of the masking data stored in the masking data buffer 18 may be displayed via the display control unit 16 on the screen of the display unit 17. As a consequence, the user may correct the masking data on the display screen of the display unit 17 by the manual operation. That is, since the user may perform such correction operations that the unnecessarily set ON-bit is changed into the OFF-bit, and conversely, the unnecessarily set OFF-bit is changed into the ON-bit as to this masking data, the user may form desirable masking data on the screen of the display unit 17.

Also, the user repeatedly executes an operation for designating an image region, the above-described transmittance of which is wanted to be changed, in plural times, so that masking data of the plural patterns are produced. As a consequence, it is also possible to form a plurality of regions whose transmittance is different from each other within a single image by employing these masking data.

Further, since the content of the masking data stored in the masking data buffer 18 is inverted, such masking data may be formed by that a portion other than the region designated by the user is equal to the image region whose transmittance is wanted to be changed.

The image forming unit 19 is equipped with a color data analyzing/mask forming unit 19a and an additional information forming unit 19b. Upon receipt of an instruction of the main control unit 11, the color data analyzing/mask forming unit 19a forms the above-described masking data. Based upon the masking data formed by this color data analyzing/mask forming unit 19a, the additional information forming unit 19b sets the additional information (namely, any one of transmittance data, depth data, and decoration flag group) to the lower-grade 2 bits of the R, G, B data of each of the pixels of the designated region portion of the image data stored in the image memory 14. Then, the image data to which this additional information is set is written into either the image data buffer 15 or the external storage unit 13.

On the other hand, in the case that the region to which the above-explained additional information is desirably set is extracted based on the color data of the pixel, this region extracting operation is carried out in accordance with not the three color (R, G, B) data of each pixel, but color difference data produced by subtracting the data values of the three colors, so that a better region separation can be achieved.

FIG. 2 and FIG. 3 are explanatory diagrams for explaining a method for separating a region based on the above-described color difference data.

This color difference data is constituted by $\Delta r$, $\Delta g$, and $\Delta b$, and is expressed as:

$$\Delta r = R - G$$

$$\Delta g = G - B$$

$$\Delta b = B - R$$

As indicated on a left side of FIG. 2, in the case of red, values of R, G, B data are expressed as [R=100, G=0, B=0], and in the case of blue, values of R, G, B data are expressed as [R=100, G=50, B=50]. In the case of light red, values of R, G, B data are expressed as [R=100, G=50, B=50]. As other colors, i.e., dark red and purple colors, values of R, G, B data are indicated in FIG. 2.

Then, as indicated on a right side of FIG. 2, color difference data $\Delta r$, $\Delta g$, $\Delta b$ of red, light red, dark red, purple, and blue colors are obtained.

A hue difference degree between two colors is calculated by employing the color difference data $\Delta r$, $\Delta g$, and $\Delta b$ based on the following formula. It should be noted that color difference data of one color is assumed as ($\Delta r_1$, $\Delta g_1$, $\Delta b_1$) and color difference data of the other color is assumed as ($\Delta r_2$, $\Delta g_2$, $\Delta b_2$):

hue difference degree=$\sqrt{\{(\Delta r_1 - \Delta r_2 + (\Delta g_1 - \Delta g_2)^2 + (\Delta b_1 - \Delta b_2)^2\}}$ The hue difference degrees calculated by this formula with respect to the respective colors such as red, light red, dark red, purple, and blue are indicated in FIG. 3.

As apparent from FIG. 3, the color difference degrees of red, light red and dark red colors with respect to blue and purple colors are larger than, or equal to "100", so that these colors may be clearly discriminated from each other by employing the hue difference degrees. The hue difference degrees of light red and dark red colors are equal to "14", namely small. As indicated in FIG. 2, when being compared with the R, G, B data, even when it is judged that these colors are completely different from each other, these colors can be derived as the similar color shade.

It should be understood that when a color of interest is very close to a neutral color (namely, black and white), and/or luminance of this color is very low, since this method with using the hue difference degree is not effective, if this color of interest is close to the neutral color (hue difference degree from black color represents low value), then the comparison based on the luminance may be required.

The above-described operations are executed by the color data analyzing/mask forming unit 19a employed in the image forming unit 19. The color data analyzing/mask forming unit 19a forms the masking data and then stores this masking data into the masking data buffer 18.

Next, when the user instructs the forming operation of the image data via the key operation unit 12, the main control unit 11 causes the additional information forming unit 19b of the image forming unit 19 to execute an additional information forming process operation.

Nowadays, in color image data, 8 bits are allocated to the respect R(red), G(green), and B(blue) color data, and each of these colors owns 256 values of gradation. As a result, it is possible to record a color image having approximately 16 million colors at the same time. However, printers cannot print out such a huge number of colors. Practically speaking, 6 bits are allocated to each of the R, G, B colors (namely, 64 stages of gradation), the color representation by the printers is limited to 0.26 million colors.

On the other hand, however, since there is a limitation in a visual capability of human's eye, even when a printed image owns color resolution higher than this eye visual capability, a human can hardly feel color differences. As a consequence, in the case of printers, the respective R, G, B color data would require only 6 bits. Even when lower-grade 2 bits of 1 byte are changed, no one can feel differences in the printed image.

In accordance with this embodiment mode, the lower-grade 1 bit to 2 bits of each of the R, G, B color data re utilized as the additional information by utilizing this visual characteristic.

Figure 4:
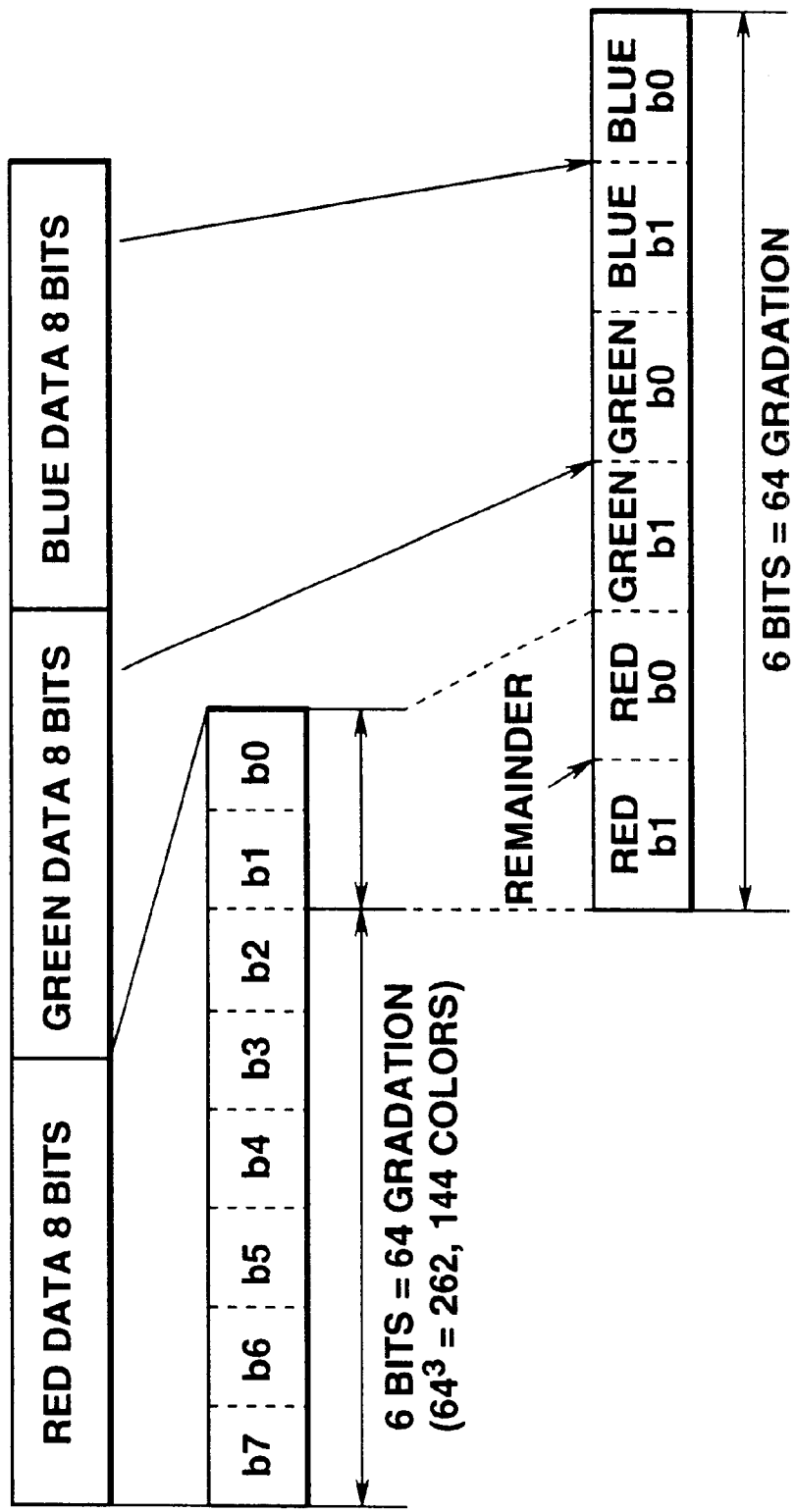
FIG. 4 is an explanatory diagram for explaining a method for acquiring a data bit used to set additional information from RGB data.

In this case, as shown in FIG. 4, when the lower-grade 2 bits are used as the additional information, the additional information having a 6-bit length may be set by utilizing the lower-grade 2 bits of the respective R, G, B color data. As a consequence, in the case of transmittance data, 64 stages of the transmittance may be set.

Based on the content of the masking data stored in the masking data buffer 18, the additional information forming unit 19b modifies the lower-grade 2 bits of the respective R, G, B color data of the respective pixels of the image corresponding to the region to which the ON-bit is set in the masking data of the image data stored in the image data buffer 15.

For example, in FIG. 1, such masking data that the image portion other than the designated figure is set to the ON-bit is stored into the masking data buffer 18. In this case, among the image data stored in the image data buffer 15 shown in FIG. 1, the values of the image data about the image portion corresponding to the region other than the above-explained designated figure, which is set to the ON-bit, are unified to values indicative of the designated transmittance data. In other words, the lower-grade 2 bits of the pixels corresponding to the background portion are unified to the values indicative of the designated transmittance data.

Figure 23:
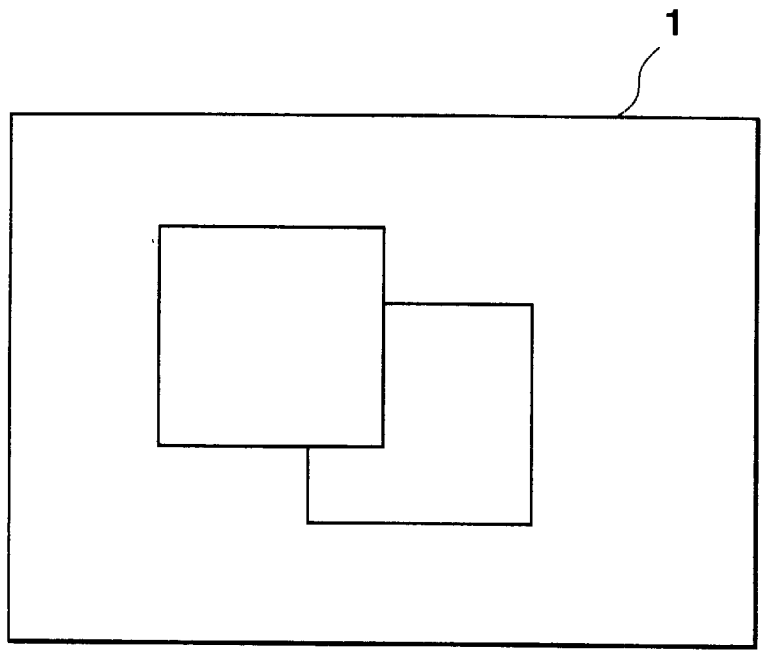
FIG. 23 illustrates an example of images to be synthesized.
Figure 24:
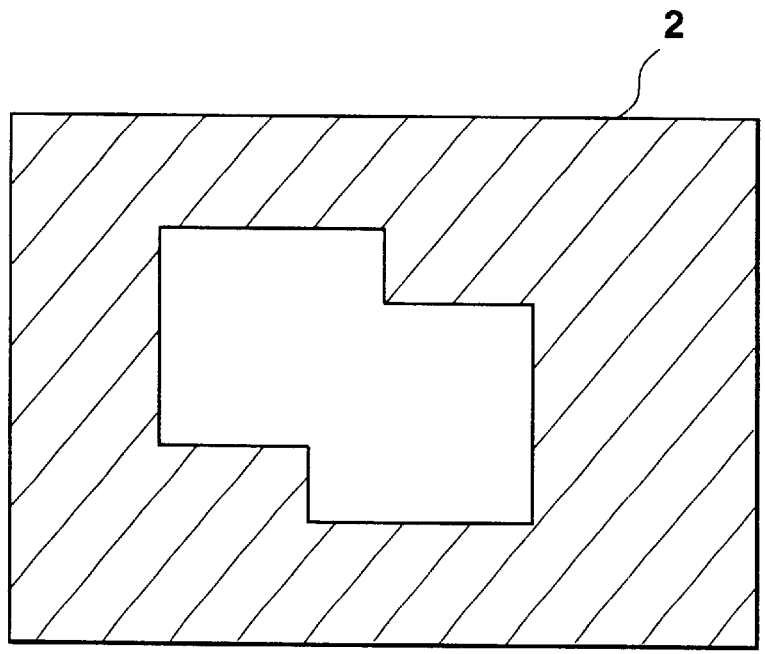
FIG. 24 shows the masking data employed in the conventional image processing operation.
Figure 25:
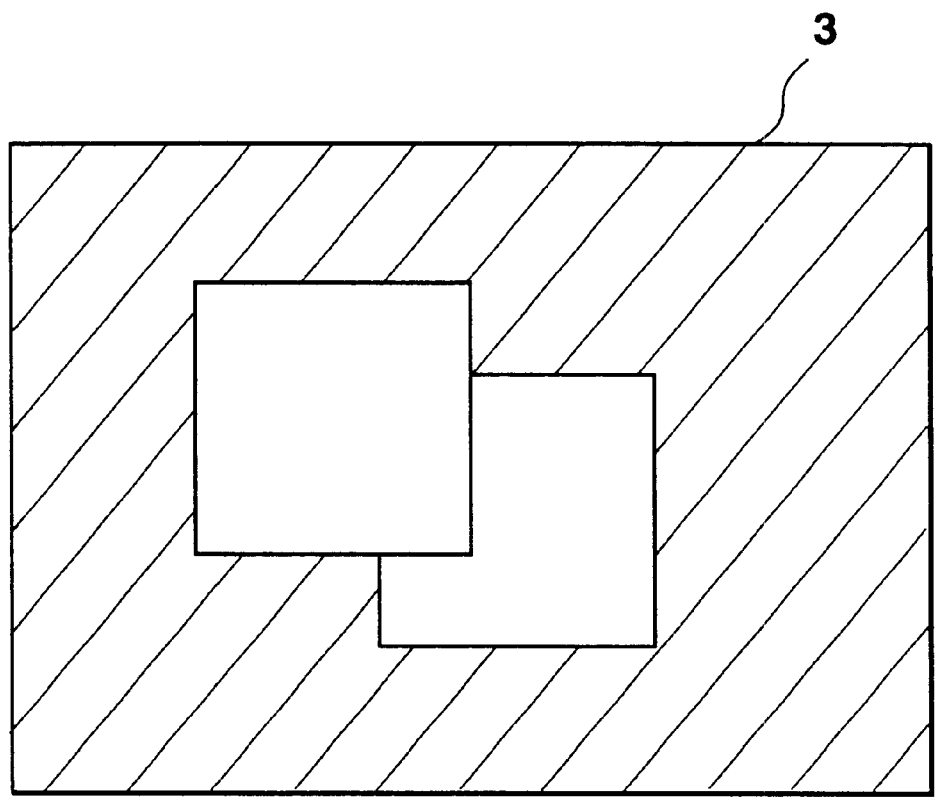
FIG. 25 indicate the subject image cut out by the master data.

For instance, FIG. 23 indicates the content of the image data stored in the image data buffer 15, whereas FIG. 24 represent the content of the masking data stored in the mask data buffer 18. That is, in the case of FIG. 24, the image portion other than the rectangular figure is designated to the region for setting the transmittance. As a consequence, in this case, the additional information forming unit 19b causes the value of the lower-grade 2 bits of the pixels of the image portion other than the rectangular figure to be unified to a preselected value of the transmittance data. However, as previously explained, even when the lower-grade 2 bits are modified, since the image can hold the practically allowable limit value of the color information, if such image data whose lower-grade 2 bits have been modified is printed by the printer, than the image shown in FIG. 23 can be outputted. In other words, such an image as shown in FIG. 25, which is exclusively used to be cut out, cannot be produced. As a result, the above-explained image data whose lower-grade 2 bits have been modified may be used as the conventional print image data. Then, when the transmittance data whose transmittance indicative 100% is set to the image data of the image region other than the rectangular figure of the image shown in FIG. 23 so as to be overlapped with the background image, the image portion other than the rectangular figure disappears (deleted). Accordingly, it seems that the background image may be floated around the rectangular figure.

Figure 5A:
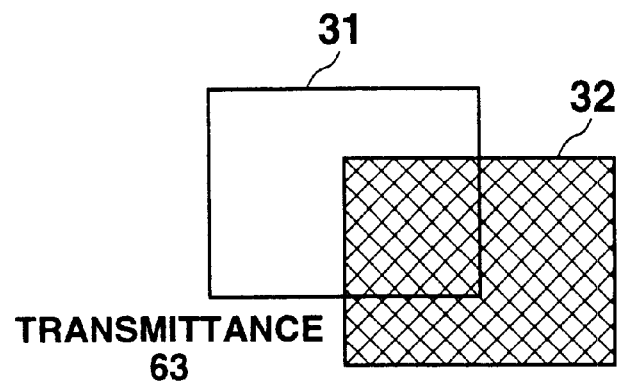
FIGS. 5A–5C illustrate image synthesizing results between a subject image and a background image based on a difference in values of transmittance data of the subject image.
Figure 5B:
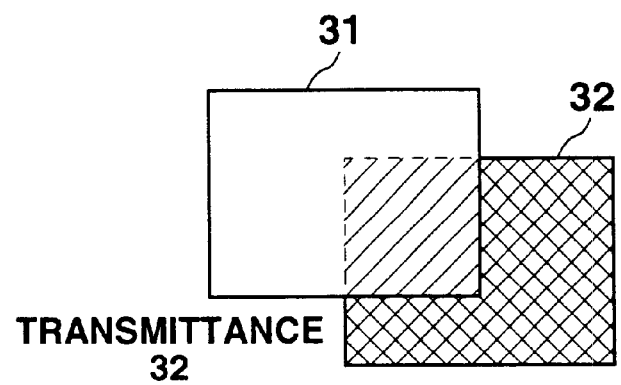
Figure 5C:
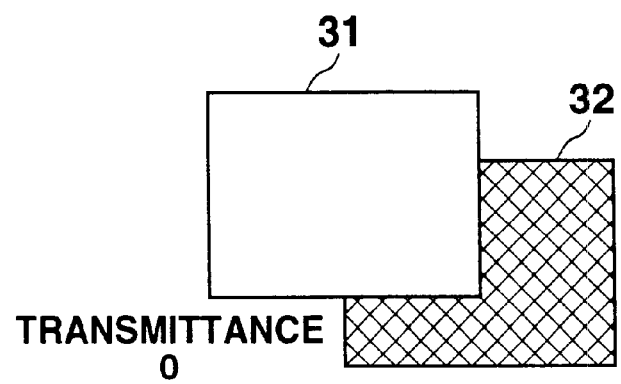

FIG. 5A to FIG. 5C are illustrations for representing image output conditions under which when a value of transmittance data of an image of interest (synthesized image) 31 is selected to be "63", "32", and "0", this image of interest 31 is overlapped with a background image 32 in the case that the transmittance data is set to 6 bits (64 gradation values).

FIG. 5A shows an image output condition when the value of the transmittance data of the subject image 31 is selected to be "63" (100%). In this case, it is seemed that the background image 32 located under this subject image 31 is floated.

FIG. 5B shows an image output condition when the value of the transmittance data of the subject image 31 is selected to be "32" (about 50%). In this case, it is seemed that the background image 32 located under this subject image 31 is floated with semitransparent feelings.

FIG. 5C shows an image output condition when the value of the transmittance data of the subject image 31 is selected to be "0" (0%). In this case, it is seemed that the background image 32 is completely overlapped by the subject image 31, and therefore an image portion of the background image 32, positioned under the subject image 31 cannot be observed.

Figure 6:
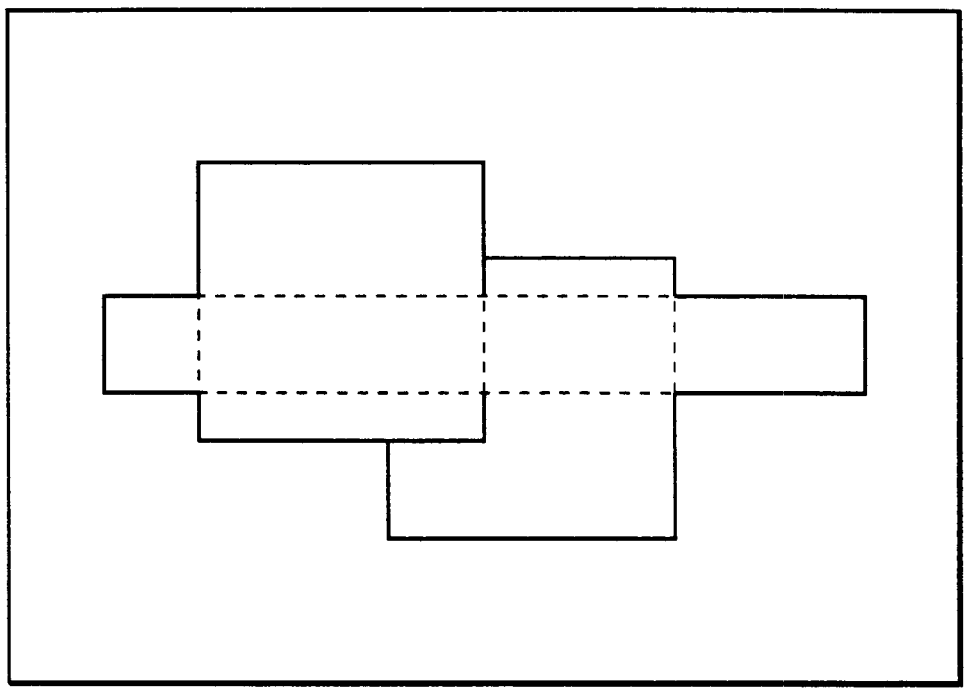
FIG. 6 shows an example of an image obtained by executing an image synthesizing process with employment of transmittance data.
Figure 26:
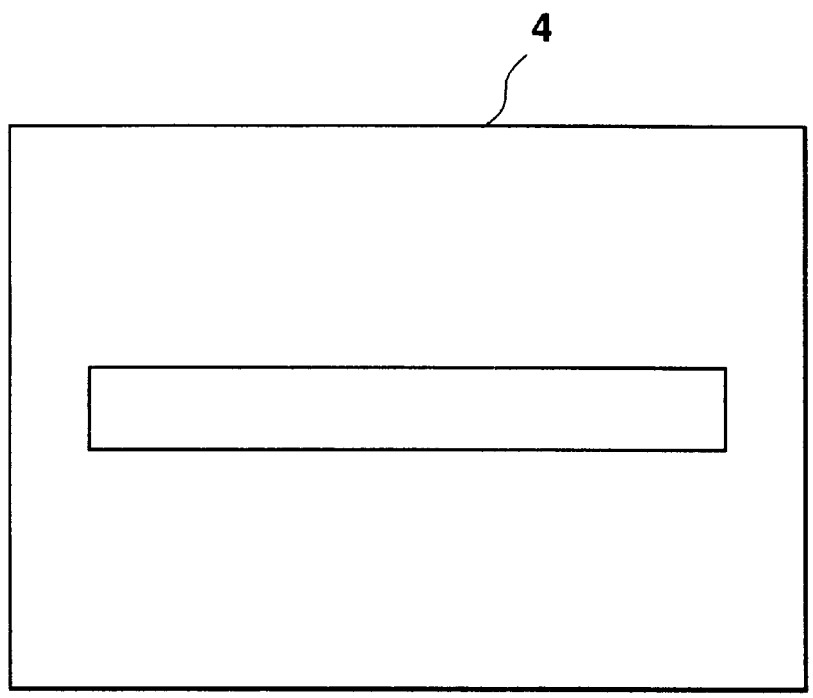
FIG. 26 represents the image which will constitute the background.
Figure 27:
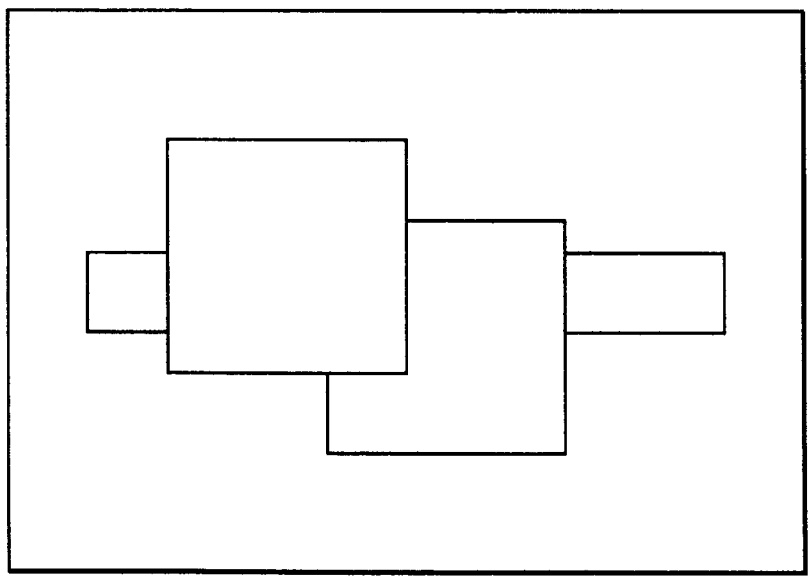
FIG. 27 indicates the synthesized image by way of the conventional image processing operation.

For instance, assuming now that the image of FIG. 26 is recognized as the background image, the transmittance of the image portion of the image shown in FIG. 26 other than the rectangular figure thereof is 100%, and the transmittance of the rectangular figure is 0%, such an image as indicated in FIG. 27 is outputted. Also, assuming now that the transmittance of the image portion of the image shown in FIG. 26 other than the rectangular figure thereof is 100%, and the transmittance of the rectangular figure is increased up to 50%, such an image as indicated in FIG. 6 is outputted in such a way that only the rectangular figure is made semi-transparent. The image shown in FIG. 6 could not be produced in the prior art.

In the image data forming apparatus 10, when the masking data formed from the color data analyzing/mask forming unit 19a is employed, the additional information forming unit 19b can form such image data to which depth data and a decoration flag group have been set (will be explained later) other than the transmittance data.

SYSTEM ARRANGEMENT OF IMAGE OUTPUTTING APPARATUS 100

Figure 7:
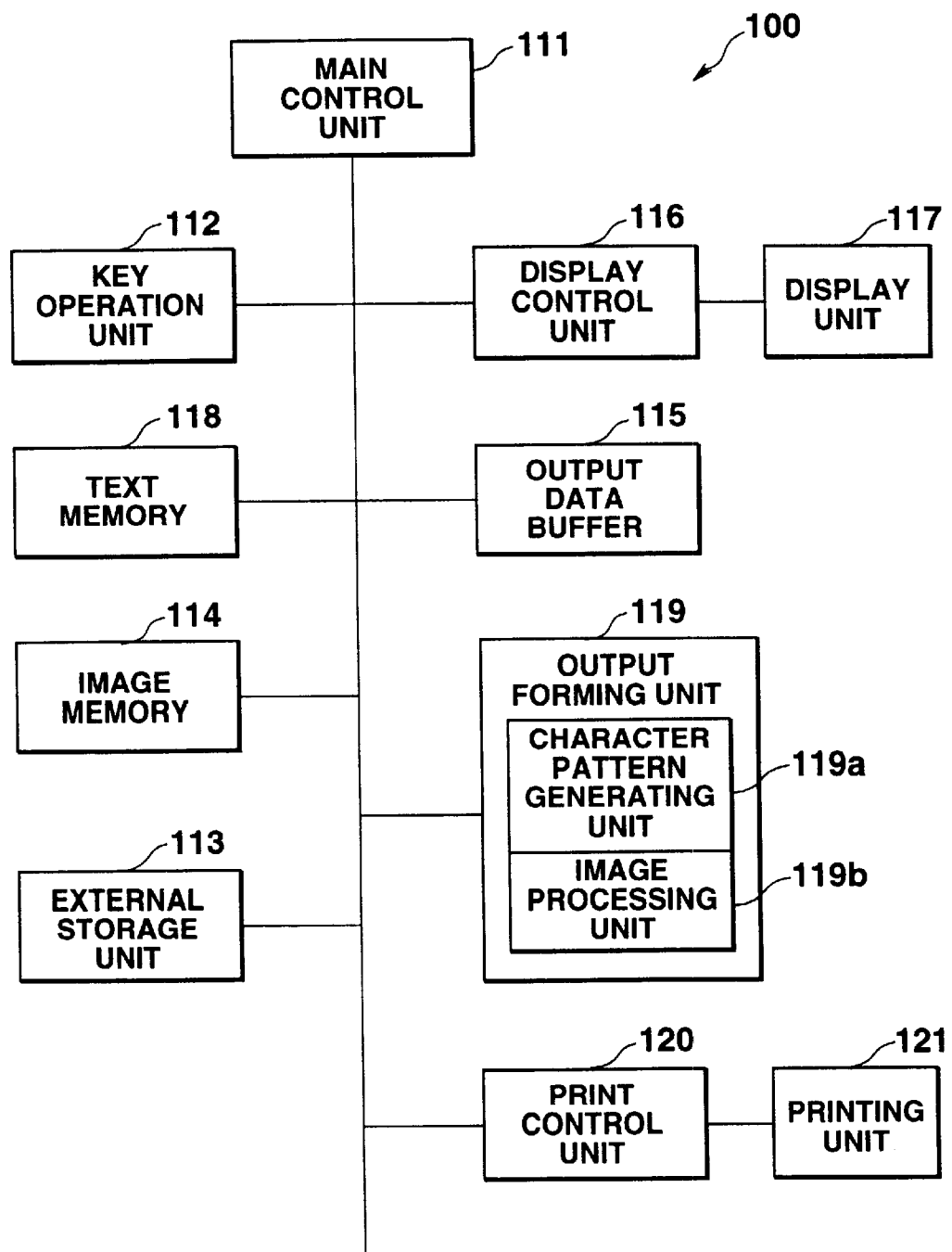
FIG. 7 is a schematic block diagram for indicating a system arrangement of an image outputting apparatus according to the first embodiment of the present invention.

FIG. 7 is a schematic block diagram for representing a system arrangement of an image outputting apparatus 100 for image-synthesizing the synthesizing image data to which the above-explained transmittance data has been set with the background image data. This transmittance data is produced by the image data forming apparatus 10.

A main control unit 11 is arranged by a microprocessor and the like, and controls the entire system by receiving an input issued from the key operation unit 112.

A text memory 118 is such a memory for storing therein arrangement position information and size information within an image output format, and further text data (character string information constructed of character code).

An image memory 114 is such a memory for storing therein the synthesizing image data and the background image data, which are formed by the image data forming apparatus 10, and image data obtained by synthesizing this synthesizing image data with the background image data in a format of a bit map image.

An output forming unit 119 forms final image data by synthesizing the text data stored in the text memory 118 with the image data stored in the image memory 114. Then, this final image data is written into an output data buffer 115.

A display control unit 116 reads out the image data stored in the output data buffer 115, and displays the content of this read image data on a screen of a display unit 117.

The display unit 117 is arranged by, for instance, a liquid crystal display.

A print control unit 120 reads out the image data stored in the output data buffer 115, and prints out this image data on a paper via a printing unit 121.

The printing unit 121 is constituted by, for instance, a serial printer, and a page printer.

An external storage unit 113 is constructed of a magnetic disk apparatus and an optical disk apparatus, and stores therein a plurality of image data loaded on the image memory 114.

A key operation unit 112 is constituted by a keyboard equipped with a pointing device such as a plurality of keys and a mouse. This key operation unit 112 is used so as to form an image, or to instruct an output of an image by a user.

The output forming unit 119 is equipped with a character pattern generating unit 119a and an image processing unit 119b.

The character pattern generating unit 119a reads out the text data from the text memory 118 to extend a character code thereof into bit map data, and then writes the bit map data into the output data buffer 115.

The image processing unit 119*b* synthesizes the synthesizing image data stored in the image memory 114 with the background image data to thereby produce a synthesized image to be finally outputted. At this time, transmittance data of the synthesizing image data is produced from the lower-grade 2 bit data of the R, G, B data of the respective pixels of the synthesizing image data.

IMAGE SYNTHESIZING PROCESS

Figure 8:
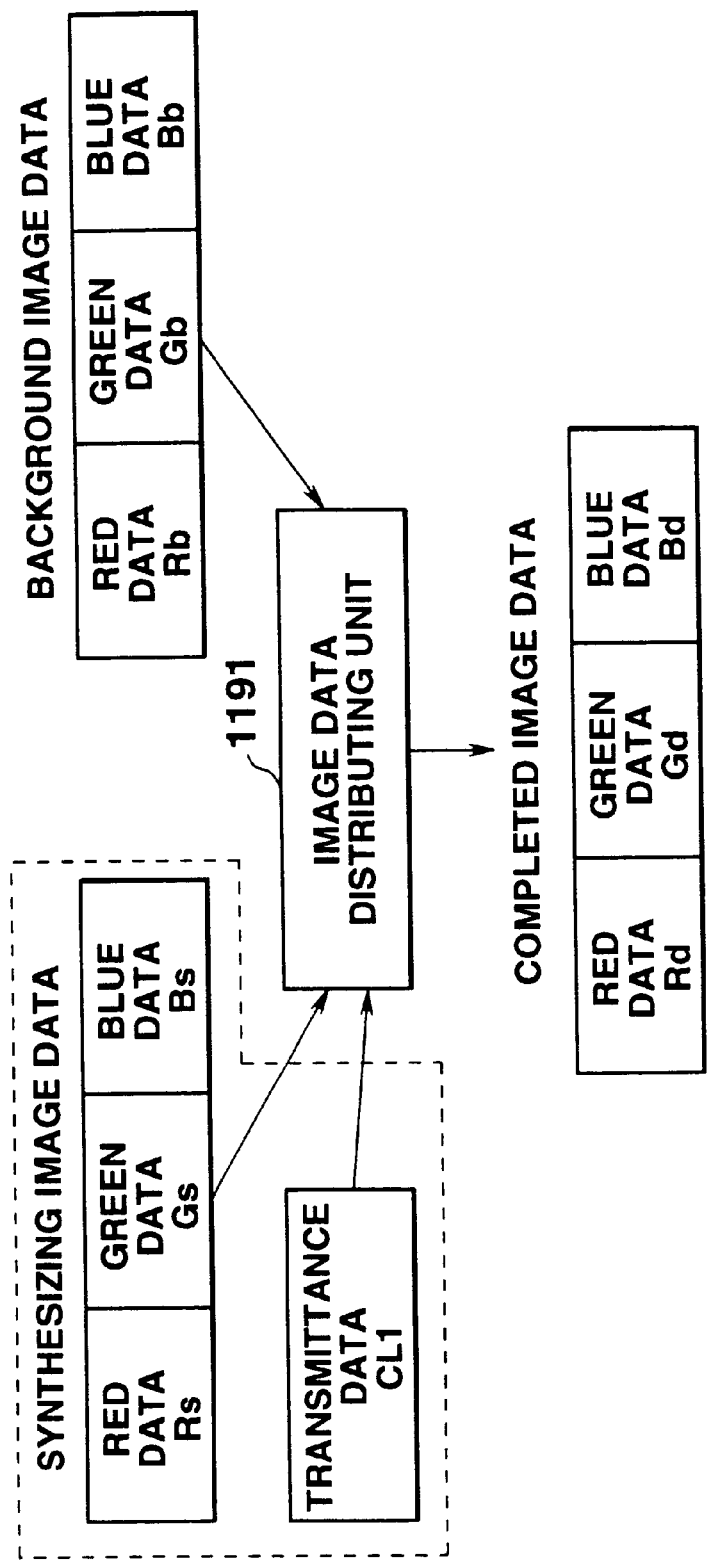
FIG. 8 is an explanatory diagram for explaining a basic idea for synthesizing a 1-pixel synthesized image with using transmittance data of a 1 pixel of synthesized image data with a background image.

FIG. 8 is an explanatory diagram for explaining an image synthesizing process operation with respect to one pixel of the synthesizing image data and one pixel of the background image data at the same position, executed by an image data distributing unit 1191. Also, FIG. 8 schematically indicates an internal arrangement of the image processing unit 119*b*.

1 pixel of the synthesizing image data is arranged by 8-bit R, G, B data (Rs, Gs, Bs), and the lower-grade 2 bits of the respective R, G, B color data are utilized as transmittance data. The image data arranging unit 1191 produces 6-bit transmittance data CL1 from the lower-grade 2 bits of the respective R, G, B color data of the respective 1 pixels. As a consequence, the transmittance data CL1 may have such a value in a range of 0≦CL1≦63. The R, G, B data of the background image data are expressed by Rb, Gb, Bb.

At this time, the image data arranging unit 1191 synthesizes the R, G, B data of the pixel of the synthesizing image data with the R, G, B data of the pixel of the background image data at the same position in accordance with the below-mentioned formulae (1) to (3):

$$Rd=\{Rb\times CL1+Rs\times(63-CL1)\}/63 \quad (1)$$

$$Gd=\{Gb\times CL1+Gs\times(63-CL1))\}/63 \quad (2)$$

$$Bd=\{Bb\times CL1+Bs\times(63-CL1)\}/63 \quad (3)$$

It should be noted that the above-explained formulae (1) to (3) are employed as one example, and therefore other formulae may be employed as the evaluation formulae of the transmittance data CL1.

FIG. 9 illustrates an example of a synthesized image which is obtained by image-synthesizing the image 3 shown in FIG. 25 as the synthesizing image data with the image 4 shown in FIG. 26 as the background image data.

Figure 9A:
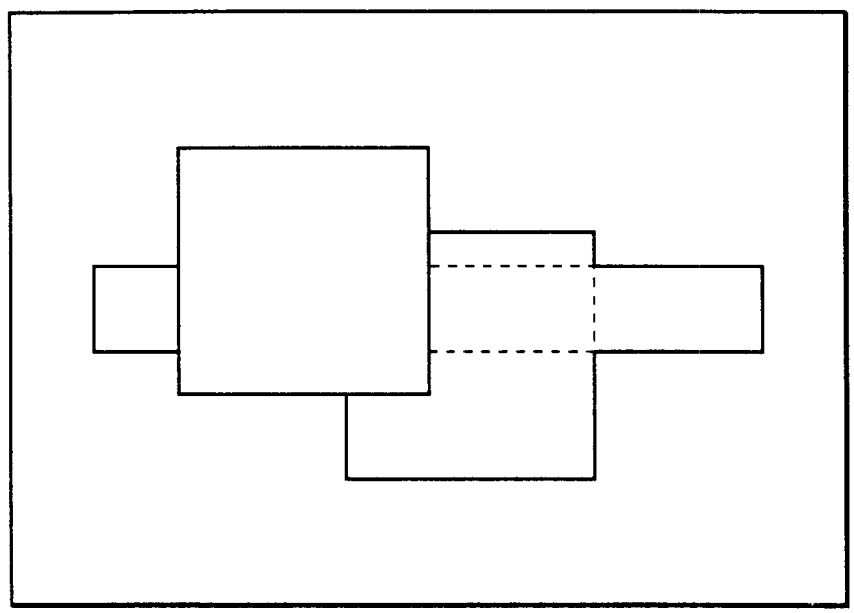
FIGS. 9A and 9B represents concrete examples of an image synthesization with employment of transmittance data.

FIG. 9A represents a synthesized image example produced by that transmittance of image data of an image portion other than rectangular figures is selected to be 100%, transmittance of image data of a right-sided rectangular figure is selected to be 50%, and transmittance of image data of a left-sided rectangular figure is selected to be 0%.

Figure 9B:
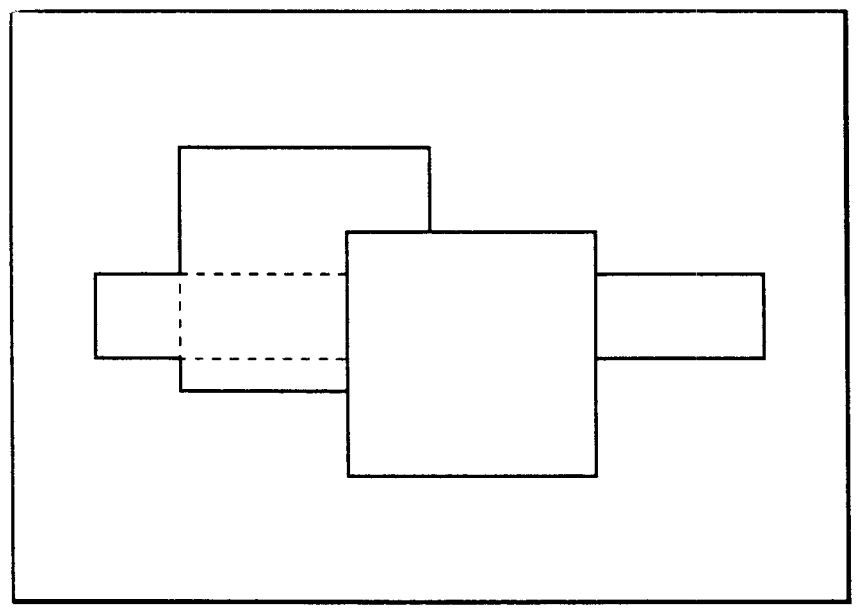

FIG. 9B represents a synthesized image example produced by that transmittance of image data of an image portion other than rectangular figures is selected to be 100%, transmittance of image data of a right-sided rectangular figure is selected to be 0%, and transmittance of image data of a left-sided rectangular figure is selected to be 50%.

Figure 10:
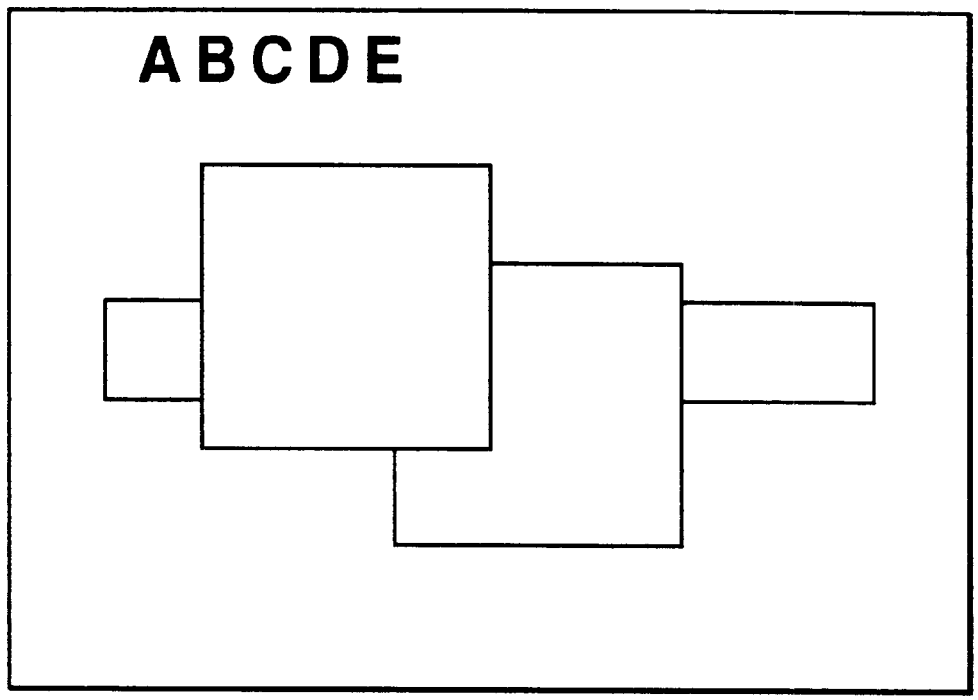
FIG. 10 illustrates an output image produced by mixing an image with a text.

Furthermore, FIG. 10 illustrates a finally outputted synthesized image obtained by further adding the text data stored in the text 118. In FIG. 10, a character string of "ABCDE" is displayed on an upper portion of this synthesized image.

OVERALL IMAGE SYNTHESIZING PROCESS OPERATION

Figure 11:
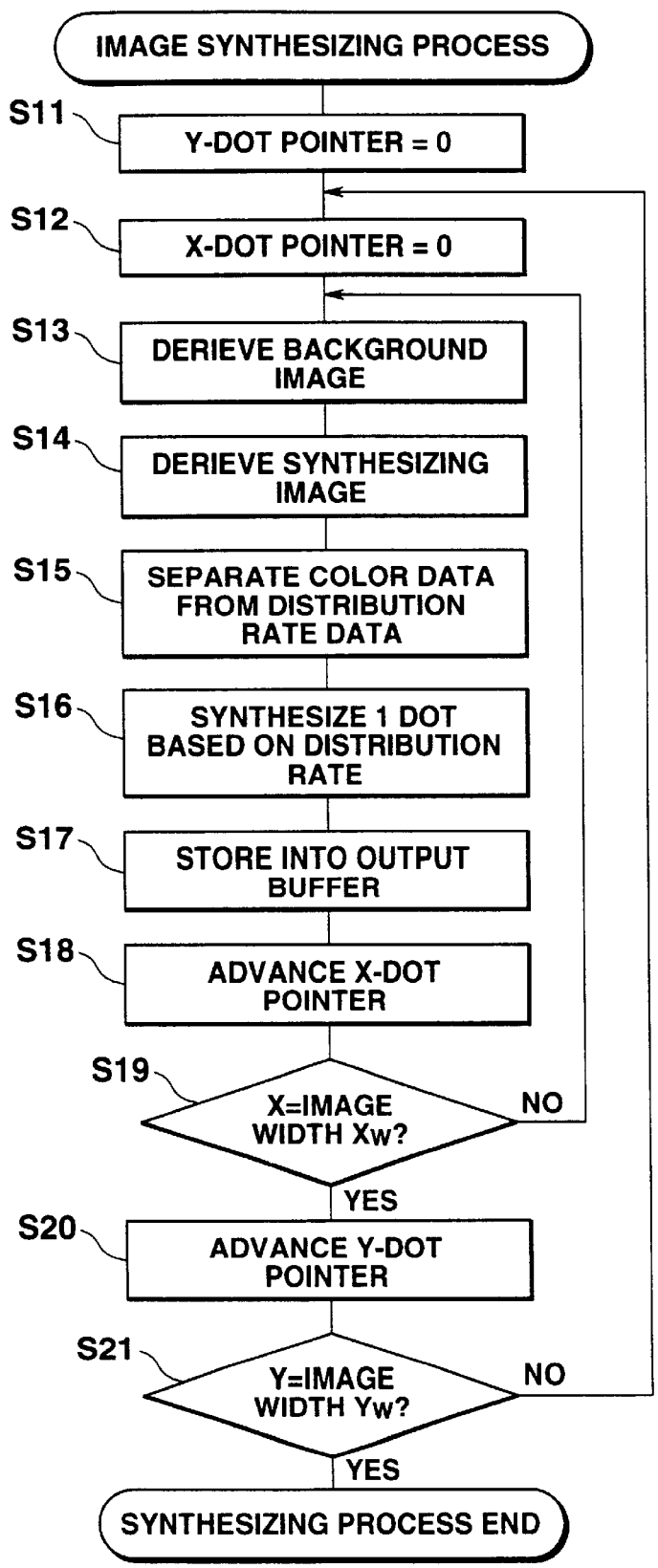
FIG. 11 is a flow chart for explaining an image synthesizing process operation with employment of transmittance data.

FIG. 11 is a flow chart for describing an overall image synthesizing process operation for the synthesizing image and the background image executed by the above-mentioned image processing unit 111*b*.

It is now assumed that as to dimensions of the synthesizing image and the background image stored in the image memory 114, a width along an X direction is "Xw" and a width along a Y direction is "Yw". Also, the image processing unit 119*b* is equipped with two pointers (X-dot pointer, and Y-dot pointer) used to determine pixels (dots) derived from the image memory 114. The X-dot pointer and the Y-dot pointer indicate a coordinate position (X) along the X direction, and a coordinate position (Y) along the Y direction of pixels about a synthesizing image and a background image at the same position, which should be fetched from the image memory 114, within the synthesizing image and the background image.

The image processing unit 119*b* first initializes the value of the Y-dot pointer to "0" (step S11). Next, the value of the X-dot pointer to "0" (step S12).

Subsequently, a pixel of the background image at the coordinate position (X, Y) is read out from the image memory 114 (step S13). Next, a pixel of the synthesizing image at the coordinate position (X, Y) is read out from the image memory 114 (step S14).

As a consequence, first, pixels of the background image and of the synthesized image at a coordinate position (0, 0) are read out from the image memory 114.

Next, the image processing unit 119*b* produces the transmittance data CL1 from the lower-grade 2 bits of the respective R, G, B color data of he synthesized image data. Subsequently, distribution rate data (=CL1−63) of the background image is calculated (step S15).

Subsequently, the respective R, G, B color data (Rd, Gd, Bd) of the pixel of the output image at the coordinate position (X, Y) are calculated, so that the 1 pixel of the synthesizing image is synthesized with the 1 pixel of the background image at the same position (step S16).

Then, the pixel of the synthesized image obtained by this synthesizing process operation at the coordinate position (X, Y) is stored into the output data buffer 115 (step S17).

With the above-described process operation, the pixel of the output image at the coordinate position (0, 0) is stored into the output data buffer 115.

Next, the image processing unit 119*b* increments the X-dot pointer by "1" (step S18). As a result, the value of the X-dot pointer becomes "1".

Subsequently, a check is made as to whether or not the value "X" of the X-dot pointer is equal to the image width "Xw" along the X direction (step S19).

Then, if X is not equal to Xw ("NO" at step S19), then the synthesizing process operation is returned to the step S13. Thus, the process operation defined from the step S13 to the step S18 is again executed. As explained above, when the value of the Y-dot pointer is equal to "0", the value of the X-dot pointer is sequentially incremented in a range between "0" and "Xw", so that the pixels of (0, 0) to (0, Xw) of the output image are formed. These pixels are stored in the output data buffer 115.

Then, when it is so judged at the step S19 that X is equal to Xw ("YES"), the value of the Y-dot pointer is incremented (step S20). As a result, the value of the Y-dot pointer becomes "1".

Next, another check is made as to whether or not the value of the Y-dot pointer is equal to the image width Yw along the Y direction (step S21). In this case, since Y is not yet equal to Yw, the process operation is returned to the step S12.

Then, after the value of the X-dot pointer is again initialized to "0" at the step S12, the process operations defined at the step S13 to the step S18 are repeatedly performed until it is so judged that X=Xw at the step S19.

As previously described, the pixels of the output image at the coordinate positions (1, 0) to (1, Xw) are formed, and these formed pixels are stored in the output buffer 115.

Subsequently, the value of the Y-dot pointer is advanced by "1" in a similar manner. Finally, a pixel of the output image (Xw, Yw) is formed. At a step S21, it is so judged that Y=Yw, and then the image synthesizing process operation is completed.

While the first embodiment has been described in detail, the bit component (namely, 2-bit image data) of the entire image data, which exceeds the practical resolution, is employed as the transmittance data. The transmittance values of the synthesizing image can be set with respect to every 1 pixel, so that the transmittance values can be varied within the synthesizing image. Therefore, the image representative capabilities when the synthesizing image is synthesized with the background image can be improved.

Also, since the practical resolution image component of the synthesizing image data to which the transmittance data is set may hold the original data, this synthesizing image data can be directly and solely used as the image data. As a consequence, in accordance with this embodiment, the exclusively-used data for synthesizing the blue-colored background image required in the prior art is no longer required.

Also, two sets of images, i.e., the synthesizing image and the background image are synthesized with each other in the above-described embodiment. The present invention is not limited to this example. Alternatively, more than 3 sets of images may be synthesized with each other. In this alternative case, the transmittance data CL1may be used in the distribution rate data of the R, G, B color data for each of more than 3 images.

IMAGE PROCESSING UNIT OF SECOND EMBODIMENT MODE

An image processing system according to a second embodiment mode of the present invention is featured by that while depth data (order data) is employed instead of the transmittance data as the additional information, a plurality of images are overlapped with each other. An entire system arrangement of this second embodiment may be made similar to that of FIG. 7. Only the internal arrangement of the image processing unit 119b shown in FIG. 7 is merely changed.

Figure 12:
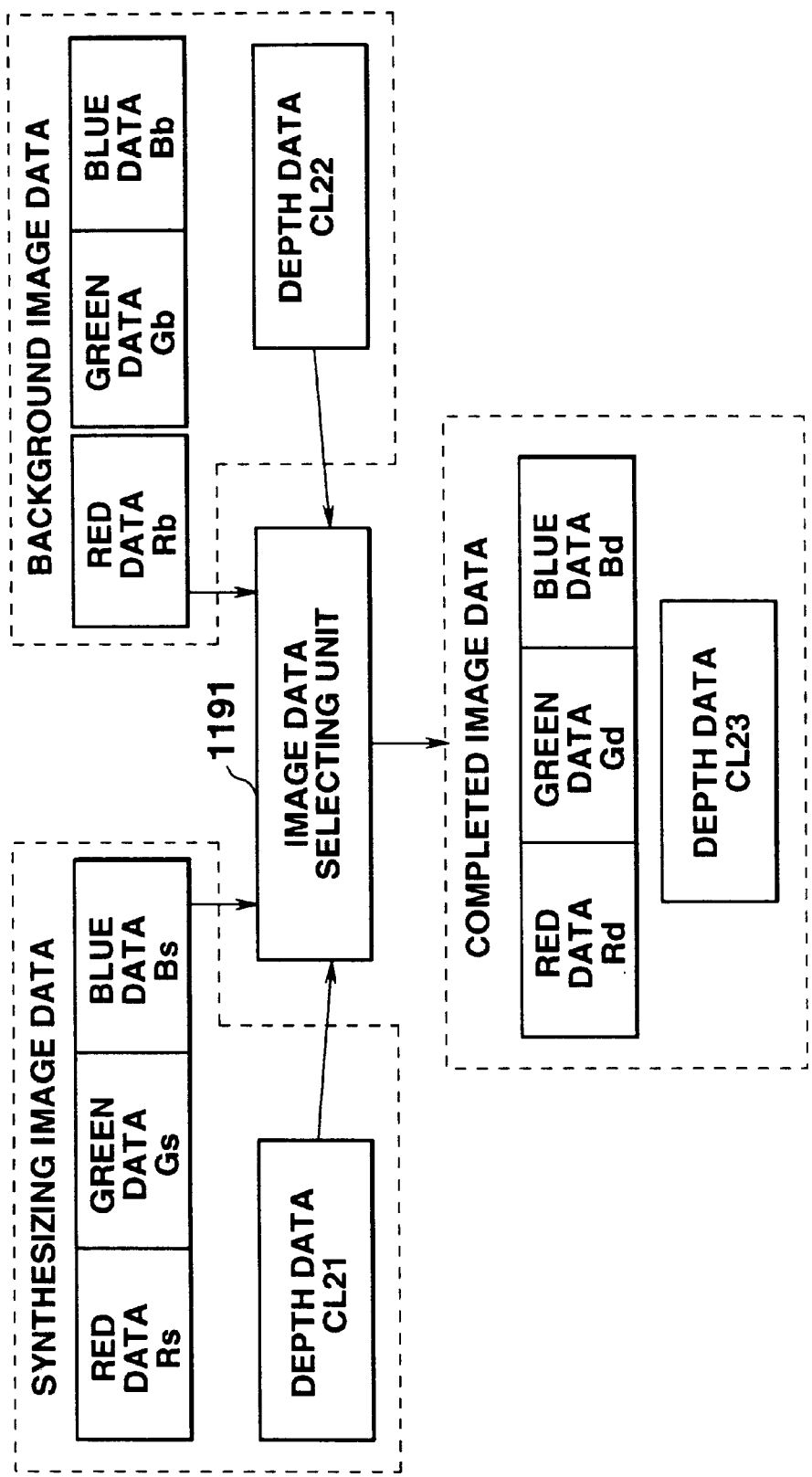
FIG. 12 schematically shows an arrangement of an image processing unit for synthesizing image data with background image data by using depth data, according to a second embodiment of the present invention.

FIG. 12 schematically shows an internal arrangement of the image processing unit 119b according to the second embodiment, and this drawing is an explanatory diagram for explaining process operations of an image data selecting unit 1192 employed in this image processing unit 119b.

The image data selecting unit 1192 forms depth data (order data) CL21 from the lower-grade 2 bits of the red data Rs, the green data Gs, and the blue data Bs of the respective pixels of the synthesizing image data. The image data selecting unit 1192 forms depth data (order data) CL22 from the lower-grade 2 bits of the red data Rs, the green data Gs, and the blue data Bs of the respective pixels of the background image data. Then, the image data selecting unit 1192 compares the dimension of the depth data CL21 with the dimension of the depth data CL22 as to the pixels of the synthesizing image data and of the background image data at the same position. Thereafter, the image data selecting unit 1192 stores the pixel of the image having the larger dimension of the depth data into the output data buffer 115.

FIG. 13A to FIG. 13E represent one example of operations of the image data selecting unit 1192.

Figure 13A:
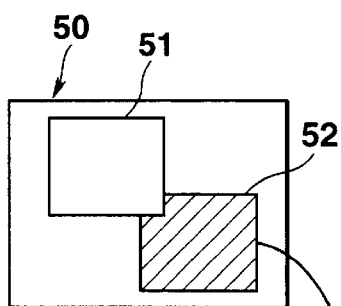
FIGS. 13A–13E illustrate application example of an image synthesizing process operation for overlapping a plurality of images by using depth data.
Figure 13B:
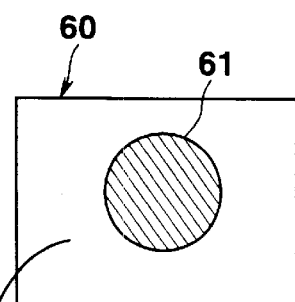

FIG. 13A illustrates synthesizing image data 50 containing a white rectangular image 51 and a hatched rectangular image 52, a portion of which is overlapped with the white rectangular image 51. As explained above, since the depth data can be set in unit of each pixel, the depth data of this white rectangular image 51 and the depth data of this hatched rectangular image 52 can be independently set. Also, FIG. 13B is an illustration for showing background image data 60 having a circular image 61 in which a fine hatching line is made.

Figure 13C:
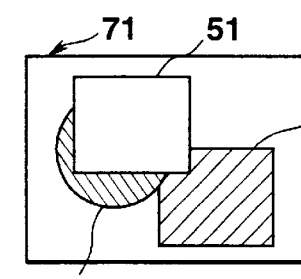
Figure 13D:
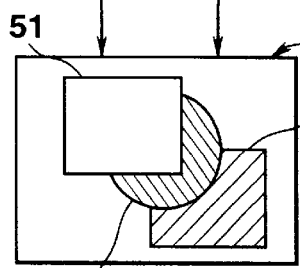
Figure 13E:
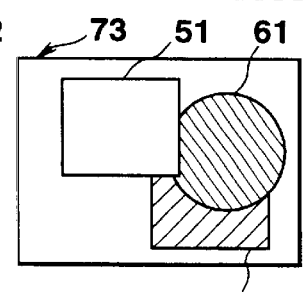

At this time, assuming now that the value of the depth data of the hatched rectangular image 52 is set to "0", the value of the depth data of the white rectangular image 51 is set to "10", and furthermore, the value of the depth data of the circular image 61 with the fine hatching line is set to "5", in the case that the synthesizing image data 50 is synthesized with the background image data 60 to form a synthesized image, the arranging position of the circular image 61 with the fine hatched line is changed, so that images 71, 72, and 73 indicated in FIG. 13C, FIG. 13D, and FIG. 13E are sequentially formed. As a consequence, it is possible to produce a certain sort of moving image under such a condition that the circular image 61 with the fine hatched line may pass through a space defined between the white rectangular image 51 and the hatched rectangular image 52.

Figure 14:
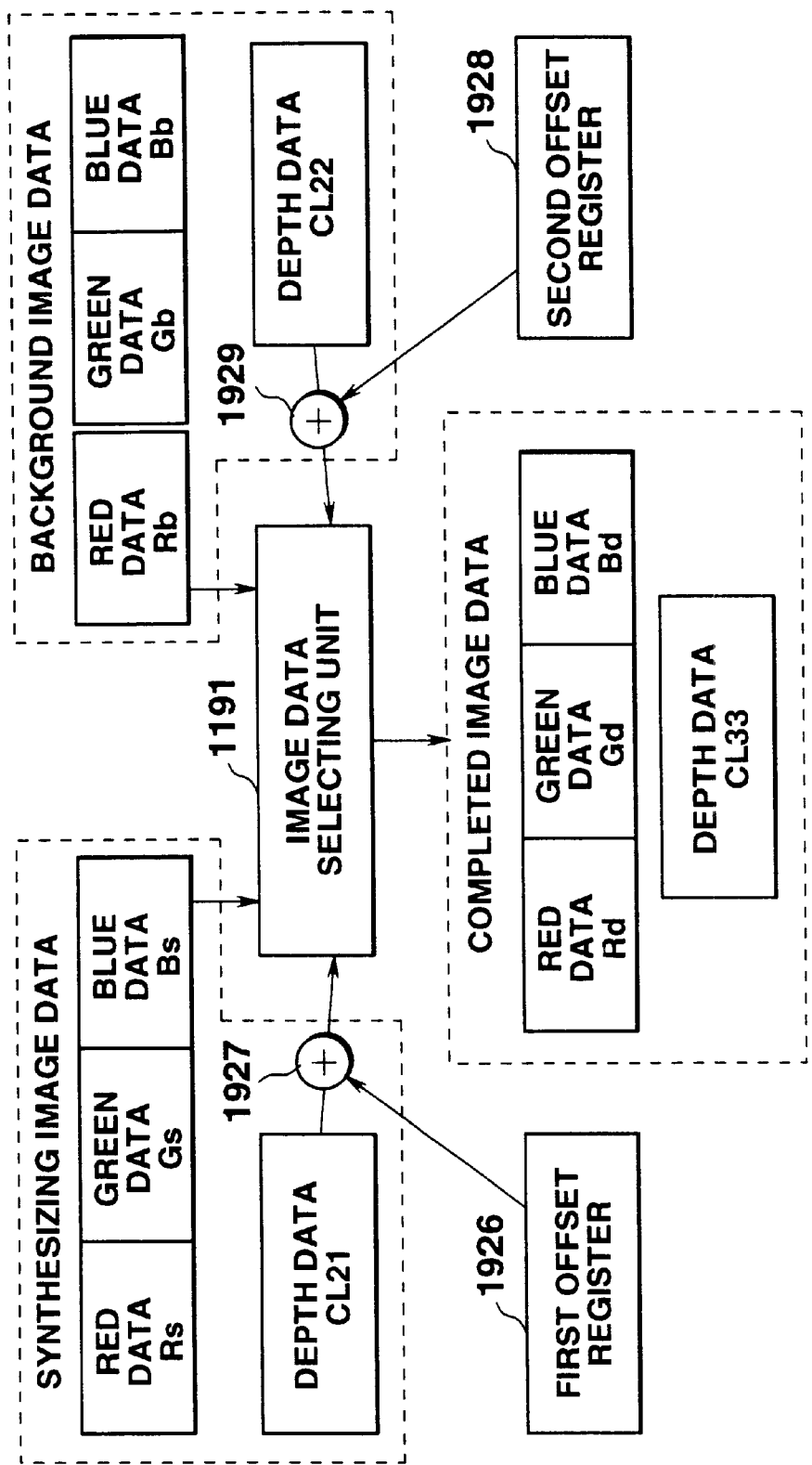
FIG. 14 indicates a structural example of an image processing unit for adding a value of an offset register to a value of depth data to overlap synthesizing image data with the background image data.

Next, FIG. 14 schematically shows a modified example of the image processing unit 119b for overlapping the synthesizing image data with the background image data by employing the depth data.

As shown in FIG. 14, a first offset register 1926 and an adder 1927 are provided on the side of the synthesizing image data. Also, a second offset register 1928 and an adder 1929 are provided on the side of the background image data.

The adder 1927 adds the depth data CL21 formed from the synthesizing image data to the value of the first offset register 1926, and outputs an addition result (first addition result) to the image data selecting unit 1192. The adder 1929 adds the depth data CL22 formed from the background image data to the value of the second offset register 1928, and then outputs an addition result (second addition result) to the image data selecting unit 1192.

The image data selecting unit 1192 compares the first addition result with the second addition result, which are entered thereinto, and when the first addition result is larger than the second addition result, the image data selecting unit 1192 causes the pixel of the synthesizing image data to be stored into the output data buffer 115. Conversely, when the second addition result is larger than the first addition result, the image data selecting unit 1192 causes the pixel of the background image data to be stored into the output data buffer 115.

In this modified example, if the values of the first offset register 1926 and the second offset register 1928 can be set on the image synthesizing side, then the depth positions of the synthesizing image data and the background image data can be controlled on the image synthesizing side.

Figure 15A:
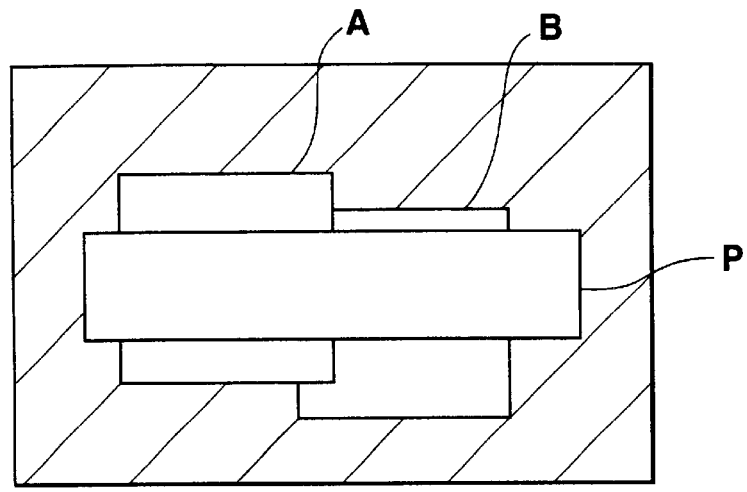
Figure 15B:
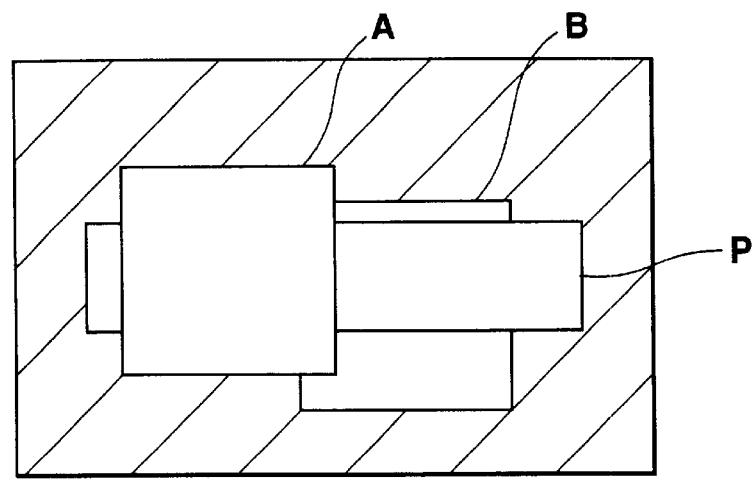
Figure 15C:
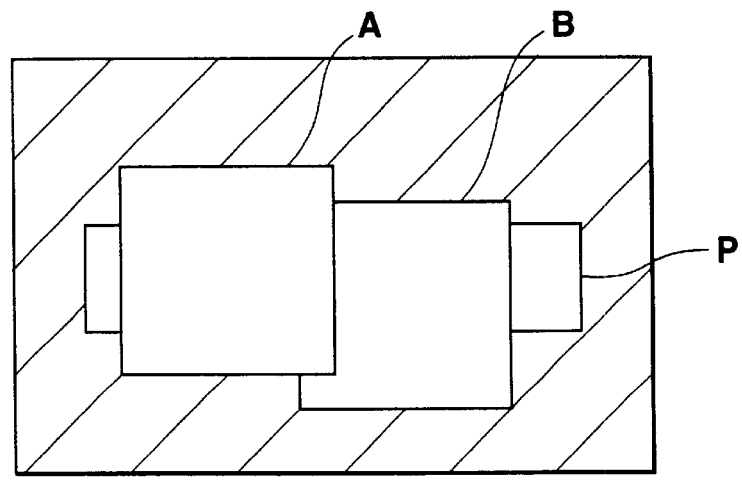

FIG. 15A to FIG. 15C illustrate an example of such an image synthesizing process operation for overlapping a synthesizing image made of two rectangular figures with a background image containing another rectangular figure, which is executed in the modified example in which this first offset register 1926 and the second offset register 1928 are employed.

In the example shown in FIG. 15A to FIG. 15C, in the background image data, a value of depth data for an image of a rectangular figure "P" is set to "10", and a depth data value of the remaining image portion is set to "5". In the synthesizing image data, a value of depth data for an image of a left-sided rectangular figure "A" is set to "9", and a value of depth data for an image of a right-sided rectangular figure "B" is set to 1171.

FIG. 15A is such an example in the case that both the values of the first offset register 1926 and the second offset register 1929 are set to "0". In this case, as to the resulting image obtained by the image synthesization, the rectangular "P" is displayed at a front, whereas the left-sided rectangular figure A and the right-sided rectangular figure B are positioned back this rectangular figure P, and therefore upper half portions of these rectangular figures A and B can be hardly observed.

FIG. 15B shows such an image obtained by that while the above-described depth data value and the value of the second offset register 1928 are similar to those of FIG. 15A, "2" is set to the first offset register 1926 on the synthesizing image data.

As explained above, since "2" is set to the first offset register 1926, the entire depth data of the synthesizing image data is added by 2. The image data selecting unit 1192 may handle these depth data values in such a way that the depth data value of the left-sided rectangular figure A is handled as "11", and the depth data value of the right-sided rectangular figure B is handled as "9". As a result, as illustrated in FIG. 15B, it is possible to form such an image that the rectangular figure P is sandwiched between the left-sided rectangular figure A and the right-sided rectangular figure B.

FIG. 15C shows such an image obtained by that while the above-described depth data value and the value of the second offset register 1928 are similar to those of FIG. 15A, "4" is set to the first offset register 1926 on the synthesizing image data.

As explained above, since "4" is set to the first offset register 1926, the entire depth data of the synthesizing image data is added by 4. The image data selecting unit 1192 may handle these depth data values in such a way that the depth data value of the left-sided rectangular figure A is handled as "13", and the depth data value of the right-sided rectangular figure B is handled as "11". As a result, as illustrated in FIG. 15C, it is possible to acquire such an image that both the left-sided rectangular figure A and the right-sided rectangular figure B are displayed in front of the rectangular figure P.

In this embodiment, since the depth data are set to the lower-grade bits of the respective R, G, B color data about each of the pixels of the image data which is image-synthesized, when a plurality of images are overlapped with each other, it is possible to achieve such an image synthesization that an arbitrary image is inserted into a space defined between other images. Also, since both the first offset register 1926 and the second offset register 1928 are provided, the overall depth data values of the synthesizing image data and the background image data can be controlled along the plus (+) direction and the minus (−) direction. As a consequence, the overlapping degrees of the plural images can be controlled. Also, a total number of overlapped images is not limited to 2, but may be selected to be more than 3.

Figure 16:
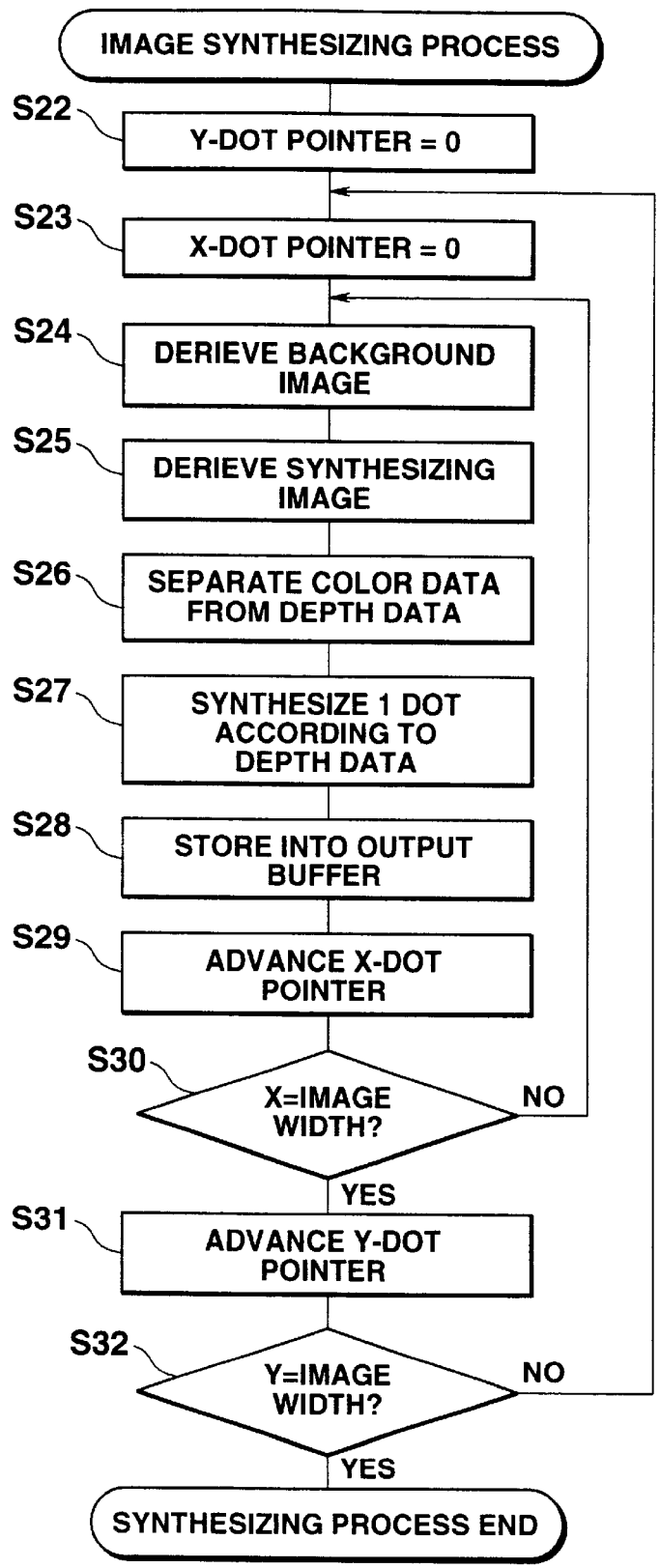
FIG. 16 is a flow chart for descripting an image synthesizing process operation with employment of depth data.

FIG. 16 is a flow chart for explaining operations of the image data selecting unit 1192 for executing the image synthesizing process operation by using as the depth data, the lower-grade bit of the respective R, G, B color data about the respective pixels of the above-described synthesizing image data, and also the lower-grade bit of the respective R, G, B color data about the respective pixels of the background image data.

The process operation defined in this flow chart for FIG. 16 is similar to that of the above-described flow chart shown in FIG. 11, except for a step S26 and a step S27 defined in this flow chart of FIG. 16.

That is, at a step S26, the image data selecting unit 1922 separates depth data from the lower-grade 2-bit data of the respective R, G, B color data of the pixels of the synthesizing image data and the background image data at a coordinate position (X, Y) to thereby form depth data CL21 and CL22. Subsequently, at a step S27, a dimension of the depth data CL21 is compared with a dimension of the depth data CL22, and in accordance with the above-explained method, synthesized image data is obtained by synthesizing the synthesizing image data with the background image data. Thus, the respective R, G, B color data of the pixel of this synthesized image data at the coordinate position (X, Y) are acquired.

In any one of the above-described first and second embodiments, the lower-grade 2-bit data are derived from the respective R, G, B color data of the synthesizing image data, or the background image data, so that either the 6-bit transmittance data or the 6-bit depth data are produced. As a consequence, when a plurality of images are synthesized with each other, it is possible to achieve a specific effect.

IMAGE PROCESSING UNIT OF THIRD EMBODIMENT MODE

An image processing apparatus, according to a third embodiment mode of the present invention, is featured by that after 6-bit data has been formed in a similar manner to the above-explained first and second embodiment modes, each bit of this 6-bit data is used as an image attribute flag. As a consequence, it is possible to provide an apparatus capable of realizing a specific effect by way of a single image.

For example, when such an attribute flag that "G(green) color data is copied to R(red) color data" is set to green-colored portions of green trees, the value of the G(green) color data can be made equal to the R(red) color data. As a consequence, the green trees can be changed into yellow trees at once. Furthermore, while the value of R(red) color data is maintained, when only the value of the G(green) color data is reduced, the yellow-colored trees are changed into the red-colored trees. Also, when an attribute flag is set to a clothing worn on a human, only the color of this clothing may be changed into another color. In addition, when a background is omitted, all of the color data of the pixels to which this attribute flag has been set are replaced by the fixed value.

Figure 17:
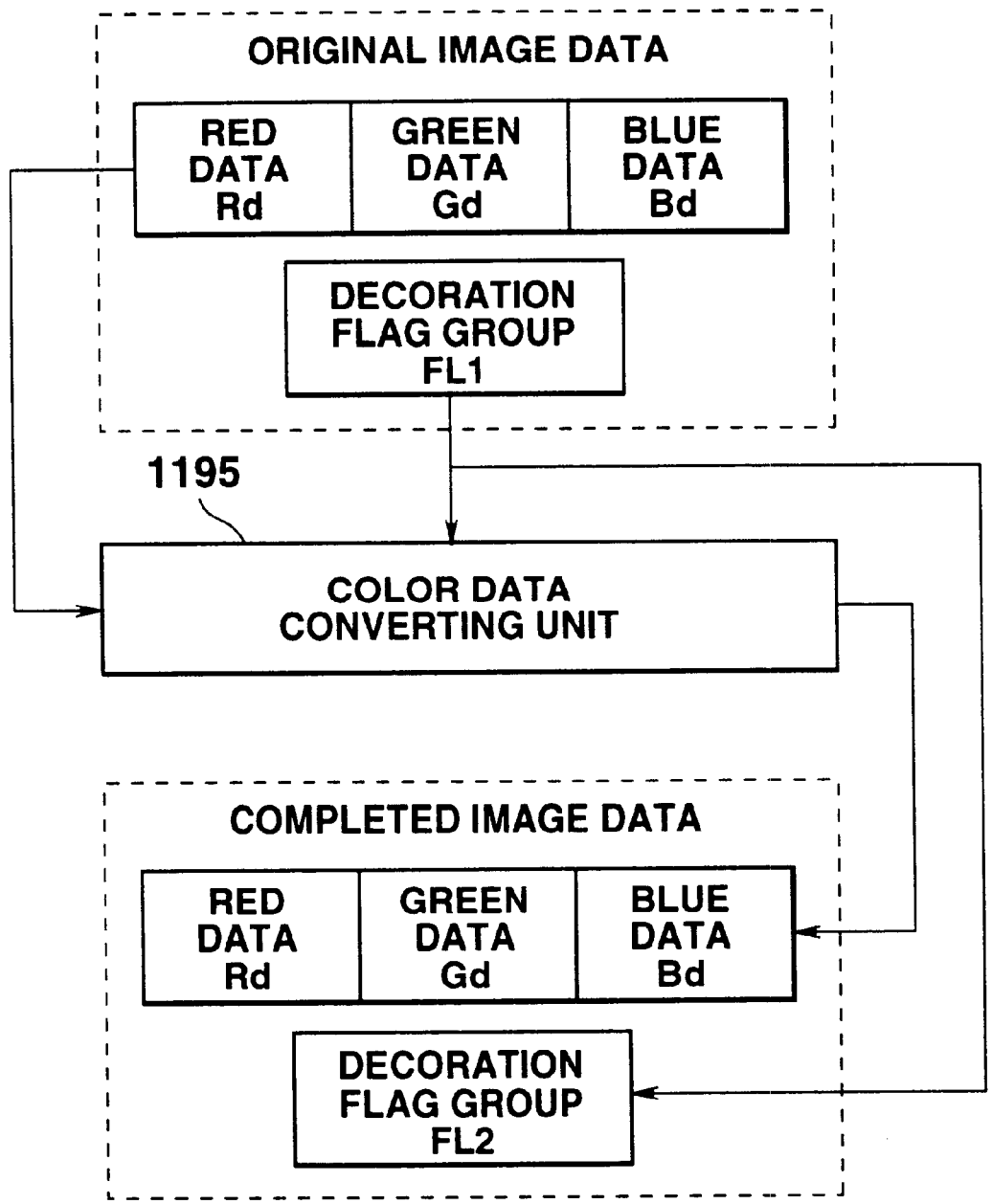
FIG. 17 represents a structural example of an image processing unit for performing an image processing operation with employment of a decoration flag group, according to a third embodiment mode of the present invention.

FIG. 17 is a schematic block diagram for showing an internal arrangement of the image processing unit 119b capable of realizing the above-described operations.

A color data converting unit 1195 produces a 6-bit decoration flag group FL1 from lower-grade 2-bit color data, i.e., red data Rd, green data Gd, and blue data Bd data, i.e., red data Rd, green data Gd, and blue data Bd of each pixel of original image data. A bit "0" to a bit "5" of this decoration flag group FL1 own attribute information as shown in FIG. 18:

bit "0" - - - value of green data Gd is copied to red data Rd.

bit "1" - - - value of green data Gd is made half.

bit "2" - - - value of all color data (red data Rd, green data Gd, blue data Bd) are set to 0.

bit "3" - - - value of green data Gd is replaced by value of red data Rd.

bit "4" - - - value of red data Rd is replaced by value of blue data Bd.

bit "5" - - - value of blue data Bd is replaced by value of green data Gd.

It should be noted that values of "1", "2", "4", "8", "16", and "32" shown in FIG. 18 correspond to values in such an assumption that the decoration flag group FL1 arranged by 6 bits is equal to 6-bit binary data, the bit "0" of which is the least significant bit (LSB) and the bit "5" of which is the most significant bit (MSB). As a consequence, "12" implies that a flag is set to the bit "0" (namely, "1" is set); "2" implies that a flag is set to the bit "1"; "4" implies that a flag is set to the bit "2"; "8" implies that a flag is set to the bit "3"; "16" implies that a flag is set to the bit "4"; "32" implies that a flag is set to the bit The color data converting unit 1195 modifies the values of the respective color data (red data Rd, green data Gd, blue data Bd) of the original image data with reference to the values of the respective bits of the decoration flag group FL1, and finally forms image data to be outputted to either the display unit 117 or the printing unit 121. In this case, the values of the flag data of the respective bits are directly maintained. As a result, for instance, in the beginning, the green data having the value of "3" (at this time, it is assumed that red data Rd="0" and blue data Bd="0") is set to green leaf portions of trees. Next, if the bit "0" of the decoration flag group FL1 is made effective (namely, flag of "1" is set), then the value of the red data Rd is changed from "0" to "0", so that the above-described green leaf portions are changed into yellow leaf portions. Furthermore, subsequently, if the bit "1" is also made effective, then the value of the green data Gd becomes "1.5". As a result, the leaf portions changed into yellow colors become red in this time.

On the other hand, in the above-explained embodiment, since the respective bits of the bit "0" to the bit "5" of the decoration flag group FL1 are employed as the flags, only 6 sorts of attribute information could be allowed to be set to the decoration flag group FL1. However, if the decoration flag group FL1 is regarded as binary data, and the attribute information is set by the numeral value of the decoration flag group FL1, then 64 different sorts of attribute information (values from "0" to "63") may be set to the 6-bit decoration flag group FL1.

The following embodiment is featured by that decoration flags are separately set to the respective image portions of an image, so that colors of the respective image portions are independently and temporally changed.

Figure 19:
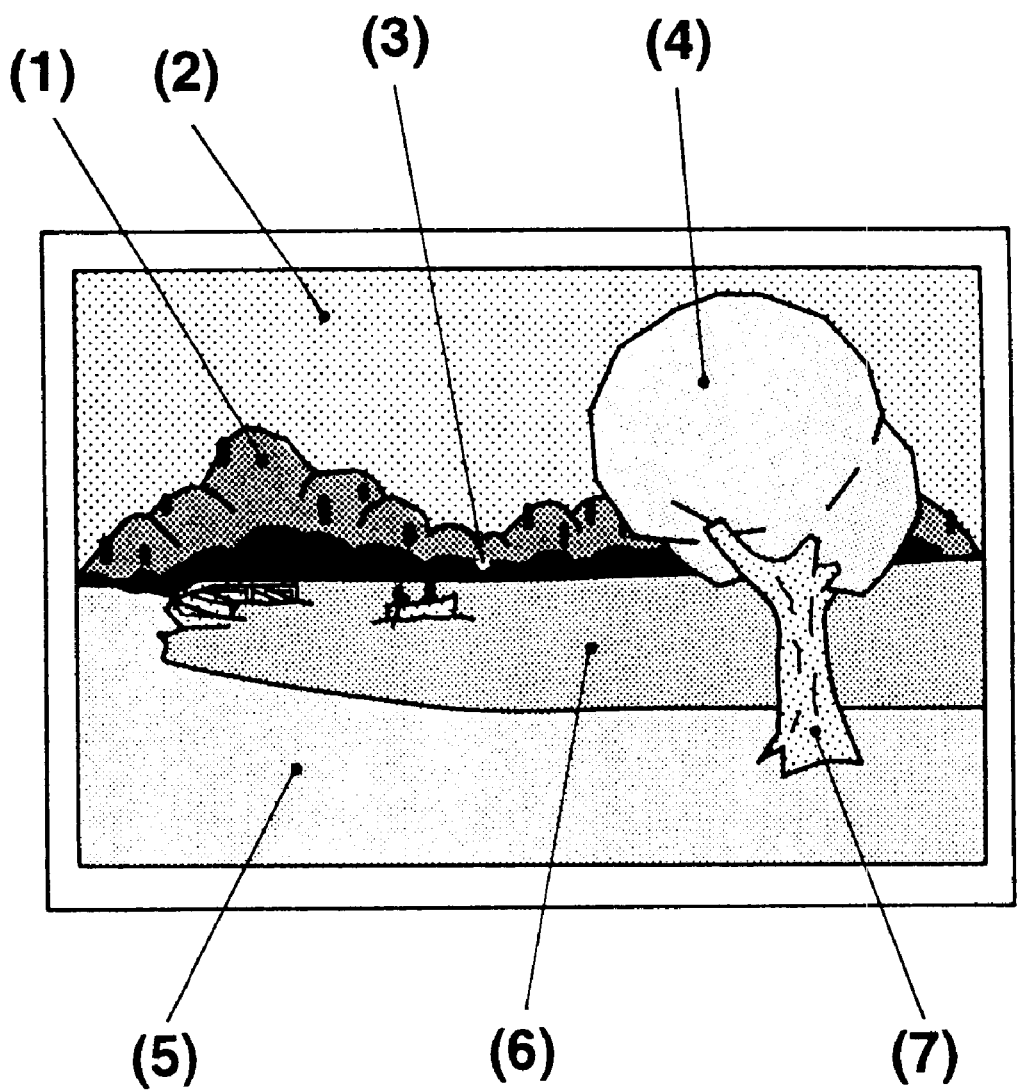
FIG. 19 shows an example of an image.

FIG. 19 is an illustration for showing an original image 180 used to explain such an example.

The original image 180 indicative of the seaside is subdivided into seven image portions (1) to (7). That is, (1) a partial image indicates mountains; (2) a partial image shows the sky; (3) a partial image represents trees located near the seaside; (4) a partial image shows leaves of trees standing on the seaside; (5) a partial image indicates sands; (6) a partial image shows a sea; and (7) a partial image indicates a trunk of a tree standing on the sands.

Thereafter, decoration flag groups (1) to (7) are allocated to these seven partial images (1) to (7), respectively. Then, in order that the values of these decoration flag groups (1) to (7) are changed in connection with time A, time B, time C and time D, respectively, a color variation table storage unit 190 indicated in FIG. 20 is provided.

Figure 20:
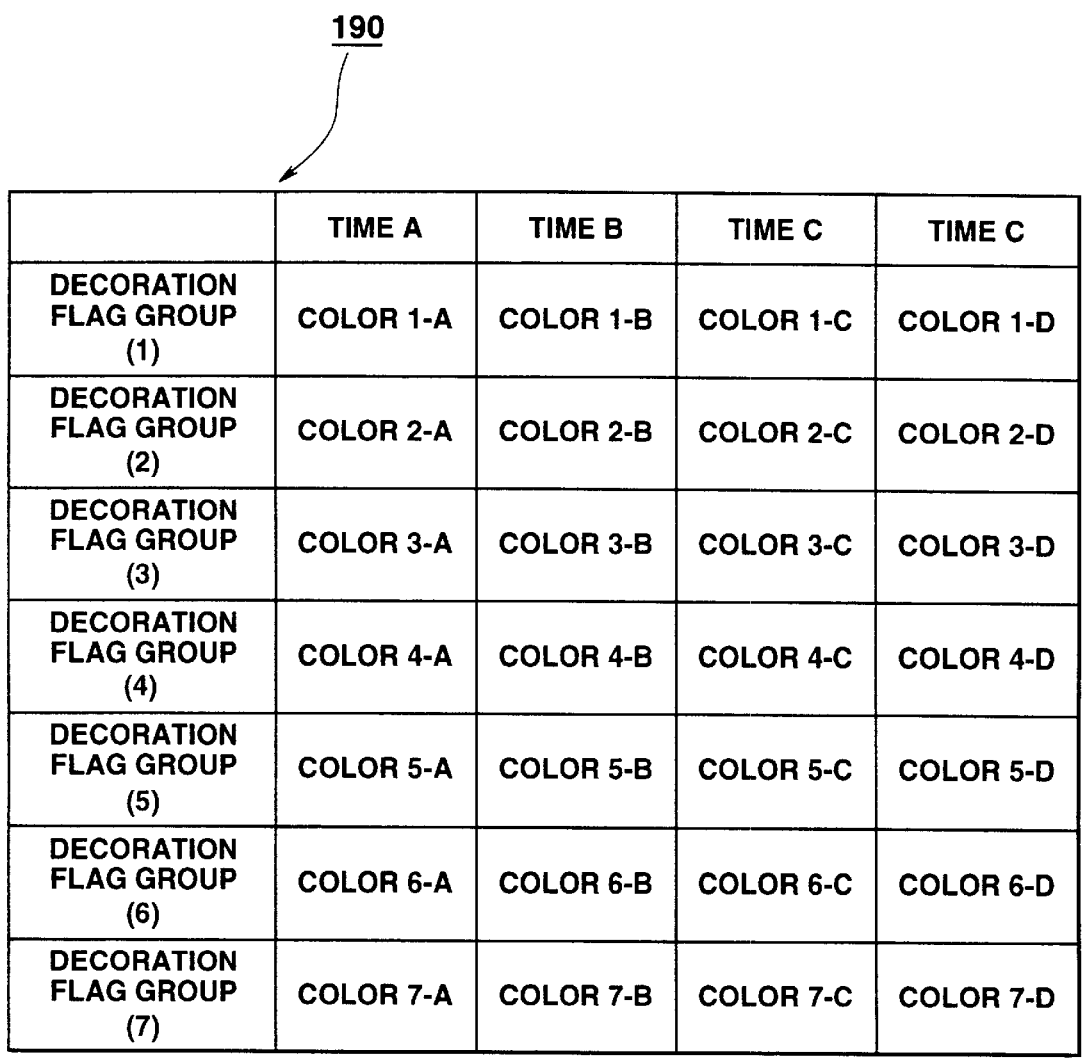
FIG. 20 indicates a structural example of a color variation table storage unit.

The color variation table storage unit 190 shown in FIG. 20 stores therein the values of the decoration flag groups (1) to (7) at the time A, the time B, the time C, and the time D. Colors 1-A, 1-B, 1-C, 1-D, - - -, 7-A, 7-B, 7-C, and 7-D represent color information set to the decoration flag groups (1) to (7).

Figure 21:
FIG. 21 shows an example of concrete data set into the color variation table storage unit.

In FIG. 21, there is shown a concrete example set into this color variation table storage unit 190.

In this concrete example, time instants of "sunrise", "standard", "sunset", and "night" are set to the time A, the time B, the time C, and the time D, respectively. At the respective time instants, "sunrise" (for instance 06:00), "standard" (for instance 12:00), "sunset" (for instance 18:00), and "night" (for instance 20:00) of the decoration flag group (1), "dark green", "light green", "dark green", and "blackish green" are set to the color 1-A, the color 1-B, the color 1-C, and the color 1-D, respectively. Also, as to other decoration flag groups (2) to (7), each of the color information as shown in FIG. 21 is set to the time instants "sunrise", "standard", "sunset", and "night", respectively.

FIG. 22A to FIG. 22D are illustrations for representing color tone variations in the original image 180 shown in FIG. 19 at the respective time instants of "sunrise", "standard", "sunrise", and "night", which are outputted when the color information indicated in FIG. 21 is set to the color variation tale storage unit 190. These illustrations of FIG. 22A to FIG. 22D are represented by gradation images.

Figure 22A:
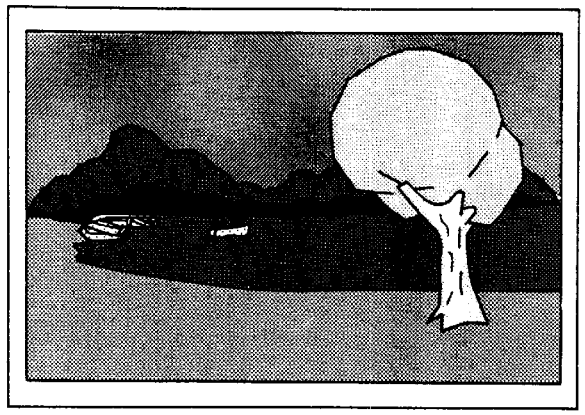
FIG. 22A to FIG. 22D are explanatory diagrams for explaining an image processing operation by using the contents of the color variation table storage unit.
Figure 22B:
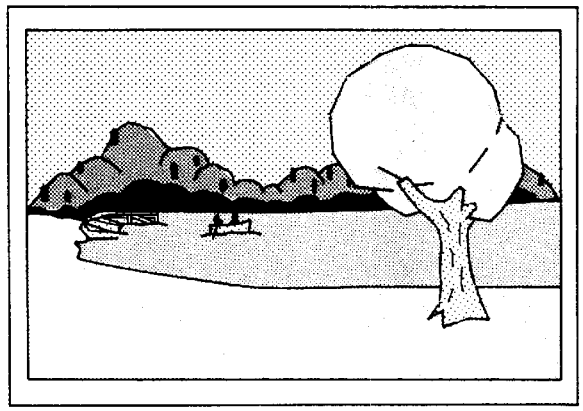
Figure 22C:
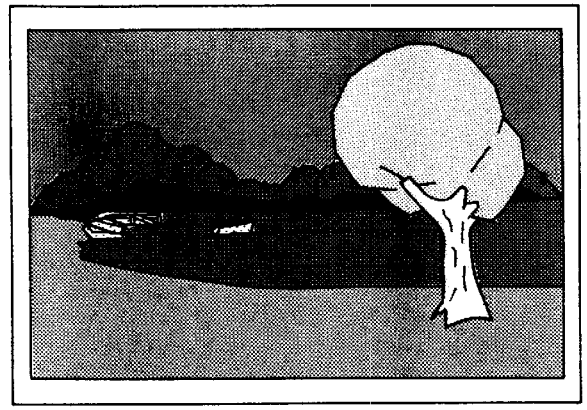
Figure 22D:
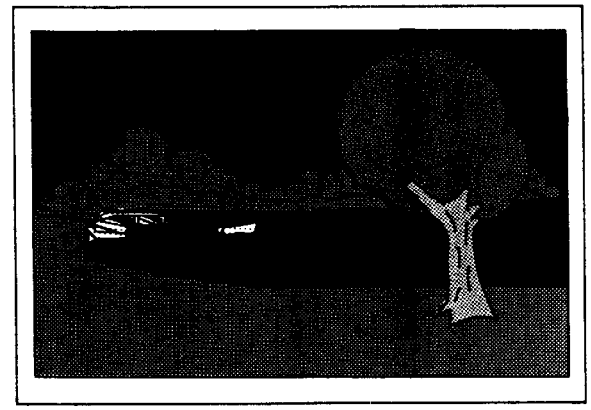

In FIG. 22A, the original image 180 is changed into a "sunrise" atmosphere. FIG. 22B shows the original image which is changed into a "daytime" atmosphere. Furthermore, in FIG. 22C, the original image 180 is changed into a "sunset" atmosphere. Then, in FIG. 22D, the original image 180 is changed into a "night" atmosphere.

As explained above, since the decoration flag group FL1 is employed, it is possible to individually change the colors of the respective partial image portions in a single image in accordance with the temporal change.

It should be understood that since the color data of the original image are similarly saved in this third embodiment mode, this original image before being converted may be utilized as the conventional color image data.

What is claimed is:

1. An image processing apparatus comprising:
   storage means for storing image data comprising color data of respective pixels, and attribute data set corresponding to said image data, said attribute data defining a change in colors;
   extracting means for extracting said set attribute data from said storage means;
   determining means for determining a color changing manner of the color data of the respective pixels of said image data based on said attribute data extracted by said extracting means; and
   changing means for changing a color of said image data by rewriting the color data of the respective pixels of said image data based on the color changing manner determined by said determining means;
   wherein said attribute data is set as a data portion of the color data of the respective pixels of said image data stored in the storage means, and said extracting means extracts the attribute data from said image data stored in said storage means; and wherein said storage means stores said image data such that said attribute data has been set to extra bit data which exceeds preselected color resolution among predetermined bit data of the color data of said respective pixels of said image data, and said extracting means extracts the attribute data from the extra bit data contained in the color data of the respective pixels of said image data with respect to each of said pixels.

2. An image processing apparatus as claimed in claim 1, wherein said image processing apparatus further comprises a color change table for defining the color changing manner used to rewrite the color data of the respective pixels of said image data over a plurality of stages in correspondence with said attribute data, and said determining means determines the color changing manner used to rewrite the color data of the respective pixels of said image data with reference to said color change table.

3. An image processing apparatus as claimed in claim 2, wherein said color change table defines the color changing manner used to rewrite the color data of the respective pixels of said image data over the plurality of stages in accordance with time.

4. An image processing apparatus as claimed in claim 1, wherein said attribute data comprises a preselected bit number of bit data, and each of said bit data defines a change in colors.

5. An image processing apparatus as claimed in claim 2, wherein said image data comprises a plurality of respective partial images, said image processing apparatus further comprises a color variation table which defines color information used to designate colors of the respective partial images in correspondence with the respective partial images, and said changing means changes the color data of the respective partial images with reference to said color variation table.

* * * * *